United States Patent [19]
Aldous et al.

[11] Patent Number: 5,336,099
[45] Date of Patent: Aug. 9, 1994

[54] MEDIA CONNECTOR INTERFACE FOR USE WITH A PCMCIA-ARCHITECTURE COMMUNICATIONS CARD

[75] Inventors: Stephen C. Aldous, Salt Lake City; Guy M. Dake, Sandy, both of Utah

[73] Assignee: Megahertz Corporation, Salt Lake City, Utah

[21] Appl. No.: 131,012

[22] Filed: Oct. 1, 1993

Related U.S. Application Data

[60] Continuation of Ser. No. 974,253, Nov. 10, 1992, abandoned, which is a division of Ser. No. 866,670, Apr. 8, 1992, Pat. No. 5,183,404.

[51] Int. Cl.$^5$ .............................................. H01R 9/09
[52] U.S. Cl. ................................... 439/131; 361/686; 439/329; 439/344
[58] Field of Search ................... 439/55, 131, 676, 329, 439/344; 361/391–395, 399, 679, 683, 686

[56] References Cited

U.S. PATENT DOCUMENTS

| | | | |
|---|---|---|---|
| 3,433,886 | 3/1969 | Myers | 174/57 |
| 4,482,938 | 11/1984 | Norden | 361/394 |
| 4,497,526 | 2/1985 | Myers | 439/81 |
| 4,511,198 | 4/1985 | Mitchell et al. | 339/34 |
| 4,809,360 | 2/1989 | Kraft | 455/603 |
| 4,954,928 | 9/1990 | Jullien | 361/391 |
| 4,969,830 | 11/1990 | Daly et al. | 439/136 |
| 4,984,982 | 1/1991 | Brownlie et al. | 439/131 |
| 4,993,962 | 2/1991 | Noda et al. | 439/136 |
| 4,997,381 | 3/1991 | Oh | 439/172 |
| 5,082,450 | 1/1992 | Warren, Sr. et al. | 439/102 |
| 5,085,591 | 2/1992 | Warren, Sr. et al. | 439/131 |
| 5,114,356 | 5/1992 | Taybl et al. | 439/133 |
| 5,122,069 | 6/1992 | Brownlie et al. | 439/131 |
| 5,132,877 | 7/1992 | Branan et al. | 439/676 |
| 5,159,533 | 10/1992 | Kuang | 361/391 |
| 5,182,698 | 1/1993 | Kobayashi | 361/391 |

FOREIGN PATENT DOCUMENTS

| | | | |
|---|---|---|---|
| 355413 | 2/1990 | European Pat. Off. | 439/131 |
| 57-56476 | 12/1982 | Japan | 439/329 |

*Primary Examiner*—Neil Abrams
*Attorney, Agent, or Firm*—Workman, Nydegger & Jensen

[57] ABSTRACT

A communications card capable of being mounted in electrical communications with a computer has formed therethrough an aperture so sized and shaped as to be capable of receiving a physical/electrical media connector. The media connector has a biased retention clip, a contact pin block, and contact pins. The retention clip has several standardized characteristics including a broad fixed end protruding from an outer surface of the contact pin block. The broad fixed end tapers abruptly at a transition notch down to a narrow free end, capable of being manipulated by a user to remove the physical-/electrical media connector from the aperture in the communications card. In use, a media connector is inserted directly into the aperture in the communications card, the aperture being in contact with a plurality of contact wires fixed within the communications card. The communications card is divided into a retractable access portion of the communications card which can be directly accessed by manipulating an actuating mechanism releasing a retention means thereby allowing a spring to push the retractable access portion of the card outside of the computer housing. The retractable access portion of the communications card may be reinserted back into the computer housing to be carried internally when not in use.

31 Claims, 14 Drawing Sheets

MEDIA CONNECTOR INTERFACE FOR USE WITH A PCMCIA-ARCHITECTURE COMMUNICATIONS CARD

This application is a continuation of U.S. application Ser. No. 07/974,253, filed Nov. 10, 1993, for MEDIA CONNECTOR INTERFACE FOR USE WITH A PCMCIA-ARCHITECTURE COMMUNICATIONS CARD AND METHODS OF MAKING SAME, which is now abandoned, which was a divisional application of U.S. application Ser. No. 07/866,670, filed Apr. 8, 1992, which has issued as U.S. Pat. No. 5,183,404, for MEDIA CONNECTOR INTERFACE FOR USE WITH A PCMCIA-ARCHITECTURE COMMUNICATIONS CARD AND METHODS OF MAKING SAME.

BACKGROUND

1. The Field of the Invention

The present invention relates to the field of computers. More particularly, it relates to an interface between a connector and a communications card in a computer system, and specifically to a physical/electrical media connector interface for use with a 5 nun PCMCIA-architecture communications card, such as used in laptop and notebook computers.

2. Related Technology

A. Data Transmission

The field of transmission of data by phone lines or network cables is a rapidly expanding field. Users of personal computers in particular are finding such practice to be of great value.

For example, there are numerous public and private networks and databases which store data or programs. Absent the ability to send and receive data over telephone lines through a modem, a user is relegated to relying upon the exchange of discs or tapes in order to receive data suitable for use with their computer.

Similarly, companies performing tasks that are integrated are aided by local area networks ("LANs") which permit personnel to exchange electronically retrievable data. The ability to freely transfer data and information from one computer to another computer over a telephone line may dramatically increase productivity and reduce overall production time.

To translate the binary code utilized by a computer into signals capable of being transmitted over the telephone lines, modems have been developed to translate and reconfigure binary signals into analog signals capable of being transmitted over telephone lines. For conversion of signals to take place, a modem must be placed between the computer generating the binary signals and the telephone line capable of carrying the analog signals.

Typically, in today's practice, a modem at the transmitting computer end of a telephone line receives binary digital data from the computer and converts the binary code received from the computer into modem frequency signals. These modem frequency signals are then transmitted over the telephone lines to a receiving modem at the receiving computer.

The modem at the recipient's end then converts the modem frequency signal back to binary digital data characters and inputs the data characters to the input port of the receiving computer.

As today's modems serve to provide a compatible interface between the phone lines and the computer, the Federal Communications Commission ("FCC") and telephone companies require an interface to moderate all signals or energy being input into the phone lines. This interface protects the phone lines and systems from damage, thereby ensuring the integrity and quality of transmissions over the phone lines.

A required part of this interface is a Data Access Arrangement ("DAA") circuit. The DAA circuit provides an impedance match and also serves to isolate the modem and the computer from transient signals and other disturbances coming in over the phone line. The DAA also protects the phone line from disabling influences emanating from the computer or the modem.

For example, damage would occur to the telephone system if instead of transmitting frequency signals, DC power was transmitted over the phone lines. Because the modem is attached directly to the phone line, the modem must incorporate the required FCC interface and must comply with any requirements imposed by local telephone companies.

The ubiquity of the telephone and the need for interactive systems throughout the world have caused standards to be established for the components of a telephonic system. Standardization allows telephone systems and devices using those systems to be interchangeable. The components of the telephone that are most thoroughly standardized are physical/electrical media connectors.

Physical/electrical media connectors are used by almost all telephone companies throughout the world for many applications, the most important of which is interconnection of telephones with telephone lines. For this reason, stringent standardization of connectors is required if compatibility and interactivity is to be realized.

One popular physical/electrical media connector used in the United States of America is the RJ-11 6-position miniature modular plug physical/electrical media connector. The RJ-11 is used between the telephone line and the telephone itself.

Unfortunately, because of the physical and electrical differences between the many pins of the peripheral ports associated with the central processing unit of a computer and the 6 pins of the RJ-11, direct physical or electrical connection of the RJ-11 to the computer is not possible.

Consequently, it has been found necessary to employ modems or similar input/output devices or cards to effect communication between computers and telephone lines. Modems reconfigure binary data from the central processing unit of the computer as received through the multi-pin peripheral port. The reconfigured data is then transmitted in analog form through the RJ-11 physical/electrical media connector into the telephone line.

B. Local Area Networks

In contradistinction to the development of telephone lines, transmission lines used in LANs have been developed specifically for the transmission of computer generated signals. Because of the recent development of these transmission lines, a variety of internal configurations for transmission lines have been developed to accomplish the transmission of computer data between computers.

Three basic cable types are available for use in transmitting encoded signals from one place to another: (1) coaxial, (2) twisted-pair, and (3) fiber optic. Each has certain advantages and disadvantages.

1. Coaxial Cable

Originally, access protocols used in LANs were tied to cable type. For example, Ethernet® and ARCnet®, two of the original LAN systems, ran only on coaxial cable. Because these protocols have been around the longest, the majority of installed LANs use coaxial cable.

Coaxial cable has four components. The first is an inner conductor—a solid metal wire. This inner conductor, is surrounded by an insulation layer. A third layer, comprised of a thin tubular piece of metal screen, surrounds the insulation. The axis of curvature of the screen coincides with that of the inner conductor; hence, the term "coaxial" has developed. Coaxial cable also has applications in cable television connection and in automotive radio installations. Coaxial cable ranges in size from thick Ethernet® (which is as thick as one-half inch) to Thinner® (which resembles cable television cable).

The advantages of coaxial cable include high bandwidth which allows it to carry signals at high speeds, relatively low susceptibility to interference, and familiarity to LANs installers.

The main disadvantage to coaxial cable is the difficulty in connecting it to LANs. Standard Ethernet® coaxial cable requires a connection commonly referred to as a vampire tap and drop cable. This connection is bulky and adds to the already high expenses incurred with the acquisition of the coaxial cable.

2. Twisted-pair Cable

Although coaxial cable has been used in LANs longer than other cable types, twisted-pair cable has been used in the communications industry longer than coaxial cable in other applications such as telephone lines. Because early experiments with twisted-pair cable resulted in slow transmission rates, coaxial cable was selected for use with LANs requiring high transmission rates. Recent advances in LANs protocols have increased the transmission rate possible with twisted-pair cable to the point that twisted pair cable is now a viable alternative to coaxial cable.

The benefits to using twisted-pair cable revolve around the availability of twisted-pair cable in almost every building constructed offering telephone service. By utilizing the twisted-pair cable already installed in buildings for telephone lines, twisted-pair cable enjoys a significant cost advantage over coaxial cable in retrofit situations. In addition, twisted-pair cable is more flexible and is easier to install in new buildings.

Due to the size and configuration of twisted-pair cable, a variety of physical/electrical media connectors may be utilized. Physical/electrical media connectors complying with FCC Rule 68.500, subpart F, such as RJ-type connectors are easily used with twisted-pair cable. As a result, one of the most advantageous features of twisted-pair cable is its connectability.

3. Fiber optic Cable

Fiber optic cable is immune to electromagnetic interference, has enormous bandwidth, sends data over huge distances, and can carry voice, video, and data. The biggest disadvantages of fiber optic cable are the price and the difficulty in connecting it to LANs. Fiber optic connectors are more difficult to install than even coaxial connectors.

Of the variety of transmission lines available, unshielded twisted pair cable seems to be emerging as the most popular variety of computer data transmission cable. Contributing to the popularity of this variety of cable at least in part, is the compatibility of this cable with a broad range of physical/electrical media connectors.

4. LAN Configurations

A typical local area network comprises several computers at remote locations throughout a building interconnected with unshielded twisted pair cable utilizing RJ-type physical/electrical media connectors. The network is typically connected to a file server. A file server is a computer providing shared access to a file system, printer, electronic mail service, or modem. The file server is a combination of hardware and software that contains files shared by everyone connected to the LAN.

As LANs utilizing unshielded twisted pair cable are capable of transmitting signals at a higher rate than signals travelling through telephone lines, the requirements of the devices used to translate and reconfigure signals from the computer for transmission through lines have consequently been developed with different requirements.

The counterpart to the modem in telephonic communications is the LAN adapter card or data communications card. In a similar fashion to a modem, these communications cards reconfigure the parallel data produced by the computer into a serial form and back. These cards also provide buffering, encoding and decoding, cable access, and transmission.

As the use of LANs increases, it has become increasingly more beneficial for users of portable computers to have the ability to interact with several local area networks at different locations. For example, information at one location may be downloaded to a portable computer that allows a user to manipulate the data during a business trip and load the manipulated data onto the network at a destination. Diagnostics and maintenance are also made easier through the use of common connectors.

As the popularity of twisted-pair cable has increased, the popularity of the most frequently used physical/electrical media connector, the 8-pin miniature modular plug, has also increased. This increase in popularity of the 8-pin miniature modular plug has introduced the same problems and solutions into LANs as will be discussed regarding the RJ-11 physical/electrical media connector in the development of modems.

C. Modem Development

1. External Modems

Many modems in use today are configured as external accessory units, housed in their own cases, and attached to the computer. Such a prior art modem is illustrated in FIG. 1 of the drawings. A modem 10 is shown near a telephone base 12 which cradles a telephone receiver 14. Modem 10 is electrically connected to the telephone with a telephone extension line utilizing physical/electrical media connectors at each end. Signals transmitted by a modem at a remote location are received over a telephone line 16. An RJ-11 physical/electrical media connector 18 is used to physically and electrically connect a local telephone extension line 20 to telephone line 16. Another RJ-11 connector is used to connect extension line 20 to modem 10.

Modem 10 converts the modem frequency signal back to binary digital data characters. The digital characters are then transmitted through a multiplexed cable 22 to an input port of a receiving computer 24. In the prior art system illustrated in FIG. 1, a DAA circuit is located within modem 10 at the point where the modem interfaces with telephone extension line 20. At this location, the DAA circuit isolates the modem and the computer from disturbances coming in or going out over the phone line.

External modems like modem 10 are often employed by users of personal computers. External modems have been popular because they can easily contain a substantial amount of electronic circuitry or hardware, as well as executable programs or software.

With the advent of downsizing technology in other computer components, however, smaller portable computers (often referred to as laptop or notebook computers) have taken the place of many of the desktop models. With the new-found portability available with laptop or notebook computers, the size of external modems has made external modems cumbersome and not in keeping with the portability that buyers of these downsized computers desire.

D. Integral Modems

To overcome the inconvenience and physical limitations of external modems, smaller modems have been developed that are small enough to be built into the housing of a portable computer. Such a modem is illustrated in FIG. 2. An integral internal modem 30 is located within the housing of a portable computer 32 at a position giving access to local telephone extension line 20. The interface between the telephone line and modem 30 is achieved through the use of an RJ-11 physical/electrical media connector and an internal DAA 34. The RJ-11 physical/electrical media connector has two components: an RJ-11 socket and an RJ-11 plug.

An RJ-11 socket 36 is formed in the housing of computer 32. This socket is capable of receiving an RJ-11 plug 38 from any of the many telephone lines utilizing an RJ-11 physical/electrical media connector system.

The ubiquity of the RJ-11 system provides users of portable computers with internal modems a uniform standard interface for media access devices such as modems. Modem manufacturers can build products capable of accepting the RJ-11 media connector with confidence that their product can be used in a wide geographical area. Because modems can be built to the RJ-11 uniform standard, consumers benefit from the ability to interchange and interconnect media access devices without the need for adapters for products made by different manufacturers.

E. Communications Cards

As computer housings have continued to be downsized, internal spatial restrictions have required the establishment of standards for the internal accessories of the computer. One set of standards applicable to memory cards has been developed by the Personal Computer Memory Card International Association (PCMCIA). This organization is comprised of hundreds of manufacturers of memory cards and related peripheral equipment. The PCMCIA has determined that the spatial standard for all memory cards used in downsized computers should be restricted to a rectangular space approximately 55 nun in width, 85 nun in length, and 5 mm in depth.

In keeping with the PCMCIA standards for memory cards, internal modem manufacturers have adopted the same spatial standards for use with their down-sized communications cards. By complying with the standards established by PCMCIA for memory cards, communications card manufacturers have assured themselves of compatibility and spatial conformity with computers utilizing the new PCMCIA standards.

The constraints imposed by this new PCMCIA standard have resulted in the development of "credit card" communications cards. Most of the components formerly housed within a modem are now contained within a credit card-sized wafer. One communications card conforming to this new PCMCIA standard is produced by Intel under the ExCA ® trademark and is similar to that illustrated in FIG. 3.

Although the communications card illustrated serves the functions of a modem, a similar card has been contemplated for use in LANs.

FIG. 4 illustrates 68 pin socket 42 which is pressed over a corresponding plug affixed to the circuit board of the computer. This plug and socket arrangement provides versatility in the selection of cards that a user may select for use with the computer. For example, extra memory cards also utilize the same PCMCIA architecture standards and may therefore be inserted over the same plug as is used with communications card 40.

FIG. 5 illustrates peripheral socket 44 in PCMCIA communications card 40. Although 68 pin socket 42 is part of the standardized electrical interface under the PCMCIA architecture, socket 44 is built into communications card 40 to correspond to the variety of plugs employed by different manufacturers. For example, socket 44 is used to interface with external media access units that contain elements of integrated modems that have not been included within PCMCIA communications card 40.

Elements not included within the communications card illustrated in FIG. 5 include the RJ-type connector interface and the DAA. The DAA and the connector interface used in the system illustrated in FIG. 5 media are housed in an external unit (often referred to as an "intermediate physical/electrical connector" or "podule"). While 68 pin socket 42 is standardized as part of the PCMCIA architecture, the shape and configuration of peripheral socket 44 varies with the needs of the manufacturers of the external intermediate physical/electrical connectors.

FIG. 6 illustrates another form of peripheral socket like that illustrated in FIG. 5. External intermediate physical/electrical connector socket 46 has a shape capable of receiving a corresponding plug for use with the DAA and RJ-11 interface housed in a podule for modem transmissions or an 8 pin modular plug interface for use with LANs. Socket 46 is manufactured into communications card 40 for use with a specific external DAA and RJ-11 interface podule. As a result, although the RJ-11 media connector is available at most locations providing telephone service, a user will still be unable to utilize an integral modem if a compatible external DAA and RJ-11 interface podule corresponding to socket 46 is not available.

FIG. 7 depicts communications card 40 inside of a downsized or laptop computer. External intermediate physical/electrical connector socket 46 is shown incorporated into communications card 40 and extending to an exposed position so that connection can be made therewith. An intermediate physical/electrical connector podule 48 houses an external DAA 50 and RJ-11 enclosed socket 36. Podule 48 is in electrical connection with communications card 40 through an external physical/electrical connector plug 52 and a connector cord 54.

In use, a telephone line is physically and electrically connected to RJ-11 enclosed socket 36 with an RJ-11 plug to form a communications interface. Incoming signals are then filtered through external DAA 50 and pass through connector cord 54 to external physical-/electrical connector plug 52. A second communications interface is formed between connector plug 52 and connector socket 46. As discussed previously, the RJ-11 communications interface is widely available, while the second communications interface between connector plug 52 and connector socket 46 is manufacturer-specific.

After passing through the second communications interface, signals are translated from analog modem frequency to binary signals compatible with the computer.

The depth of a PCMCIA standard communications card is limited to 5 mm. However, the depth of a media connector such as the RJ-type or 8-pin miniature modular plug is approximately 8-12 mm. As a result, an RJ-11 or other modular connector exceeds the depth restrictions imposed by the PCMCIA standards for internal computer components. Direct internal connection of the physical/electrical media connector would necessitate encroaching on a neighboring card space—an approach advocated by some manufacturers, but requiring the sacrifice of space that could be used to provide additional memory capacity.

While an external DAA and adaptor solve the problem of incompatibility between computers and modems or LANs, the solution necessitates carrying an extra item (namely the external DAA podule) whenever use of the modem is desired. The advantages of easy portability afforded by downsized computers are somewhat negated by the need to carry along extra interfacing devices.

A second problem encountered by users of external DAA's is that there is no standardization among the various manufacturers of external DAA's. As a result, intermediate physical/electrical connector podule 48 may take several forms, no one form allowing use of an external DAA made by a different manufacturer. It is, therefore, imperative that an appropriate external DAA is carried along whenever the computer is transported to a different location. As no direct interface with the communications card is afforded without the adaptor, failure to remember the adaptor results in an essentially nonfunctional communications system or LAN.

Another solution advocated by some manufacturers to the incompatibility of the RJ-11 connector with the PCMCIA memory card size constraints is illustrated in FIG. 8. PCMCIA communications card 40 is shown with an integrated physical/electrical connector 56 attached at the location where enclosed socket 44 is usually located. A small DAA is located within integrated connector 56 to filter signals passing therethrough. RJ-11 connector socket 36 is formed in a free end of connector 56. The height of connector 56 is approximately 10 mm, thereby allowing RJ-11 socket 36 to be contained therein. Incorporation of integrated connector 56 allows an 8 mm RJ-11 plug to interface with the 5 mm communications card 40.

FIG. 9 illustrates the communications card and connector of FIG. 8 installed in a laptop computer. 68 pin socket 42 is installed over a corresponding plug in electrical communication with the circuit board of the computer. Although communications card 40 complies with the 5 mm PCMCIA size restrictions, the 10 mm integrated connector 56 does not. As a result, integrated connector 56 must either be placed outside of the computer housing or must displace memory cards in adjoining slots.

Operation of the communications card requires only the connection of an RJ-11 plug into RJ-11 enclosed socket 36 or an RJ-45 or 8 pin modular plug for use in LANs. Signals received from remote modems are filtered by the internal DAA and converted by communications card 40.

Although this solution to the RJ-11 LAN interface problem eliminates the need for carrying extraneous components and eliminates the incompatibility of those components, some problems unique to the integral physical/electrical connector are introduced.

For example, the extension of integral connector 56 beyond the housing of the computer exposes the connector to the possibility of breakage even when the connector is not in use. The protrusion beyond the normal dimensions of the computer also interferes with the fit of computer portfolios used in transporting many laptop computers.

It would, therefore, be an advancement in the art to provide a 5 mm PCMCIA-architecture communications card that is capable of direct connection with a miniature modular plug physical/electrical media connector.

Yet another advancement in the art would be to provide a direct media connector interface for use in laptop and notebook computers that does not displace contiguous memory cards.

A further advancement in the art would be to provide a communications card that complies with the 5 mm PCMCIA memory card space configuration limitations while also providing direct connection with a miniature modular plug physical/electrical media connector.

A still further advancement in the art would be to provide a communications card that allows the computer housing to retain its designed shape free from any added protrusions or added external equipment.

Another advancement in the art would be to provide a 5 mm PCMCIA-architecture communications card/media connector interface that is capable of being carried internally when not in use.

Still another advancement in the art would be to provide a communications card/media connector interface that is free from reliance on an enclosed physical-/electrical media connector socket.

A further advancement in the art would be to provide a communications card connecting system that is free from reliance upon an external Data Access Arrangement circuit.

A still further another advancement in the art would be to provide a communications card connecting system that is free from reliance on any components which must be carried externally in addition to the computer.

Another advancement in the art would be to provide a LAN adaptor card capable of direct connection with a miniature modular plug physical/electrical media connector.

Still another advancement in the art would be to provide a LAN adaptor card that is capable of being carried internally in the computer when not in use.

Yet another advancement in the art would be to provide a LAN adaptor card connecting system that is free from reliance on any components which must be carried externally in addition to a portable computer.

OBJECTS AND BRIEF SUMMARY OF THE INVENTION

It is, therefore, one object of the present invention to provide a 5 mm PCMCIA-architecture communications card that is capable of direct connection with a miniature modular plug physical/electrical media connector.

Another object of the present invention is to provide a direct media connector interface for use in laptop or notebook computers that does not displace contiguous memory cards.

Yet another object of the present invention is to provide a communications card that complies with the 5 mm PCMCIA memory card space configuration limitations while also providing direct connection with a miniature modular plug physical/electrical media connector.

Still another object of the present invention is to provide a communications card that allows the computer housing to retain its designed shape free from any added protrusions or added external equipment.

Yet another object of the present invention is to provide a 5 mm PCMCIA-architecture communications card/media connector interface that is capable of being carried internally when not in use.

Still another object of the present invention is to provide a communications card/media connector interface that is free from reliance on an enclosed physical-/electrical media connector socket.

Yet another object of the present invention is to provide a communications card connecting system that is free from reliance upon an external Data Access Arrangement circuit.

A further object of the present invention is to provide a communications card connecting system that is free from reliance on any components which must be carried externally in addition to the computer.

A still further object of the present invention is to provide a LAN adaptor card capable of direct connection with a miniature modular plug physical/electrical media connector.

A further object of the present invention is to provide a LAN adaptor card that is capable of being carried internally in the computer when not in use.

Yet another object of the present invention is to provide a LAN adaptor card connecting system that is free from reliance on any components which must be carried externally in addition to the portable computer.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described herein, an interface for use between a miniature modular plug physical/electrical media connector and a PCMCIA-architecture communications card such as used in laptop and notebook computers is provided.

The media connector capable of being used with the present invention has a biased retention clip, a contact pin block, and contact pins. The retention clip has several standardized characteristics, including a broad fixed end protruding from an outer surface of the contact pin block. The broad fixed end tapers abruptly at a transition notch to a narrow free end. A user manipulates the narrow free end to disengage the media connector from the communications card.

In use, a media connector (such as an RJ-type 6 or 8-pin miniature modular plug) is inserted directly into an aperture in a communications card having a plurality of contact wires in electrical connection with both the computer and the aperture. This direct connection obviates the need for any adapters to facilitate connection of the media connector to the communications card.

The aperture is sized and configured as to be capable of receiving the media connector. The orientation of the aperture to the communications card is important as the contact wires must be in electrical contact with the contact pins in the media connector to properly communicate electrical signals therethrough.

Two structures present in an enclosed physical/electrical media connector socket, the retention clip ridge and the socket floor must be present in all arrangements attempting to retain the media connector.

Accordingly, one aspect of the invention overcomes the limitations of the PCMCIA communication card by orienting the aperture at an angle relative to the face of the communications card. An aperture formed normal to the surface of the communications card would not allow retention of both the retention clip and the bottom of the connector pin block. The transition notch in the retention clip must be captured by a retention ridge located more than 5 mm from the tip of the media connector. The 5 mm PCMCIA restriction thus prevents any structure from capturing the transition notch and the bottom of the connector pin block.

By angling the aperture, however, sufficient surface area is exposed within one side of the aperture to capture the transition notch with a retention ridge while simultaneously supporting the bottom of the connector pin block with an abutment ledge.

Means for utilizing tension produced between the biased retention clip and the aperture to secure the contact pin block to the communications card with at least one of the contact pins in electrical engagement with at least one of the plurality of contact wires are also provided.

The tension utilizing means have a broad retention clip groove formed in a wall of the aperture capable of accepting the broad fixed end of the retention clip. The broad retention clip groove has a floor and walls and a retention ridge formed in at least one of the walls of the broad retention clip groove. The retention ridge is capable of capturing the transition notch of the retention clip as tension produced between the biased retention clip and the opposing wall of the aperture urge the broad fixed end of the retention clip into the broad retention clip groove.

Simultaneously, the transition notch is forced over the retention ridge by the tension between the connector pin block and an opposing wall of the aperture as the media connector is pushed into the aperture.

Means for preventing passage of the contact pin block completely through the aperture in the communications card are also utilized in the present invention. The passage prevention means utilize a ledge protruding into the aperture from one of the walls of the aperture to prevent passage of the connector pin block completely through the communications card. The passage prevention means allows the elimination of many of the structures of an RJ-type socket.

Alternate embodiments of the invention incorporate stirrups of a variety of shapes capable of engaging either the transition notch of the retention clip to retain the physical/electrical media connector against the communications card or the bottom of the contact pin block.

One embodiment utilizes an open retention channel to provide lateral support to a media connector that is inserted parallel to the face of the communications card. A depending stirrup captures the media connector and maintains the media connector in electrical contact with exposed contact wires fixed in the retention channel.

The preferred embodiment of the present invention utilizes an aperture formed perpendicular to the surface of the communications card. Complete passage through the aperture is prevented by a depending stirrup blocking the travel of the contact pin block completely through the aperture. This presently preferred embodiment utilizes an angled aperture at an angle of 90° when measured from the plane of the face of the communications card. Unlike other embodiments of the invention utilizing angles other than perpendicular, this embodiment overcomes the depth restrictions of the PCMCIA communications architecture by allowing the contact pin block to protrude below the plane of the lower surface of the communications card to a point where it is captured by the depending stirrup and prevented from further travel. Structures formed in the aperture such as a retention ridge capture the biased retention clip and hold the physical/electrical media connector in electrical communication with the retractable access portion of the communications card.

Methods for manufacturing the interface and systems for directly accessing the interface in the communications card are also contemplated by the present invention.

The system for directly accessing the interface utilizes means for selectively exposing a retractable access portion of the communications card outside of the computer housing. This system allows the communications card to be carried internally within the housing of the computer when the communications card is not in use.

When needed, one embodiment provides a retractable access portion of the communications card which can be directly accessed by manipulating an actuating mechanism which releases means for retaining a portion of a communications card within a computer housing thereby allowing means for biasing to push the retractable access portion of the card external to the computer housing. The travel of the retractable access portion is limited so that the retractable access portion of the communications card will remain in electrical contact with the remainder of the communications card.

After exposure of the retractable access portion of the communications card, the media connector is inserted directly into the aperture to facilitate electrical connection between the telephone line and the computer.

After use, the retractable access portion of the communications card is reinserted back into the computer housing to be carried internally when not in use. As the media connector plug is inserted directly into the aperture in the communications card without any intermediate adaptor, no enclosed RJ-11 or RJ-45 connector socket is needed. The elimination of the enclosed RJ-11 or RJ-45 connector socket reduces the overall height required for the media connector interface.

Additional height reduction is accomplished in some embodiments by angling the aperture relative to the upper face of the communications card. This angular orientation allows the aperture in the communications card to present a longer realized aspect relative to the media connector to allow capture of the transition notch therein.

When combined with the height reduction provided by the elimination of the need for an enclosed RJ-type connector socket, the angular orientation of the aperture allows for direct connection of a conventional RJ-11 media connector with the PCMCIA standard communications card.

The PCMCIA communications card utilizes an integral DAA. As a result, no extra components need be carried along with the computer to facilitate data transfer over telephone lines. Any readily available RJ-11 media connector may be directly inserted into the aperture in the communications card.

The present invention also contemplates a LAN adaptor connection system utilizing a PCMCIA communications card configured for use with a local area network. In use, a physical/electrical media connector having a physical structure described in FCC Part 68, subpart F physical/electrical media connector is inserted directly into the angled aperture in the PCMCIA-architecture LAN adaptor card. This direct connection obviates the need for any external adapters to facilitate connection of the RJ-type media connector to the LAN adaptor card.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are therefore not to be considered limiting of its scope, the invention will be described with additional specificity and detail through the use of the accompanying drawings in which.

DETAILED DESCRIPTION OF THE PREFERRED EMBODIMENTS

As used in this specification, the phrase PCMCIA 5 mm communications card refers to a communications card falling within the Personal Computer Memory Card International Association memory card parameters for communications cards having a thickness less than the thickness of a miniature modular jack physical/electrical media connector.

The term miniature modular jack physical/electrical media connector connotes a media connector such as those connectors having physical attributes described in F.C.C. Part 68, subpart F, a portion of which is attached hereto as Appendix A and is hereby incorporated by reference. Specific terms such as RJ-type, RJ-11, RJ-45, 6-pin miniature modular plug, 8-pin miniature modular plug, etc. are all references to specific exemplary physical/electrical media connectors falling within the broader parameters of the term physical/electrical media connectors and should not be used to limit the scope of the invention to specific connectors.

Figure 1:
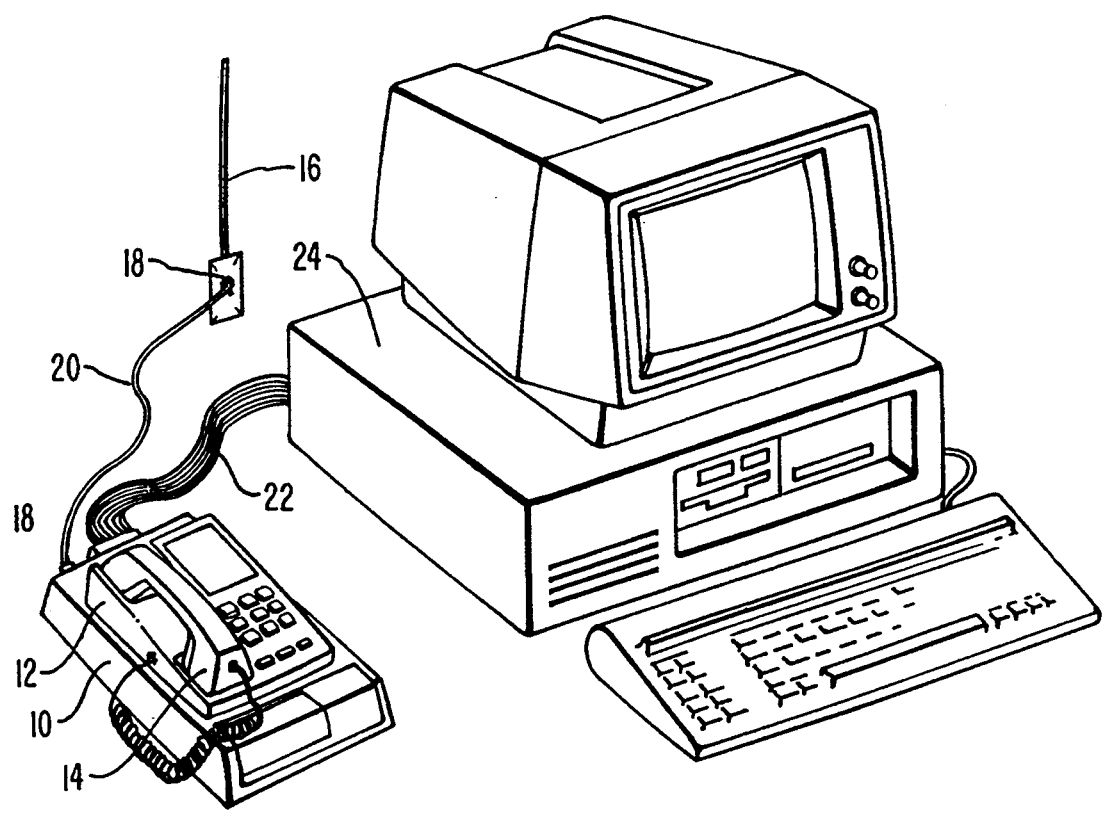
FIG. 1 is a perspective view of a prior art external modem.
Figure 2:
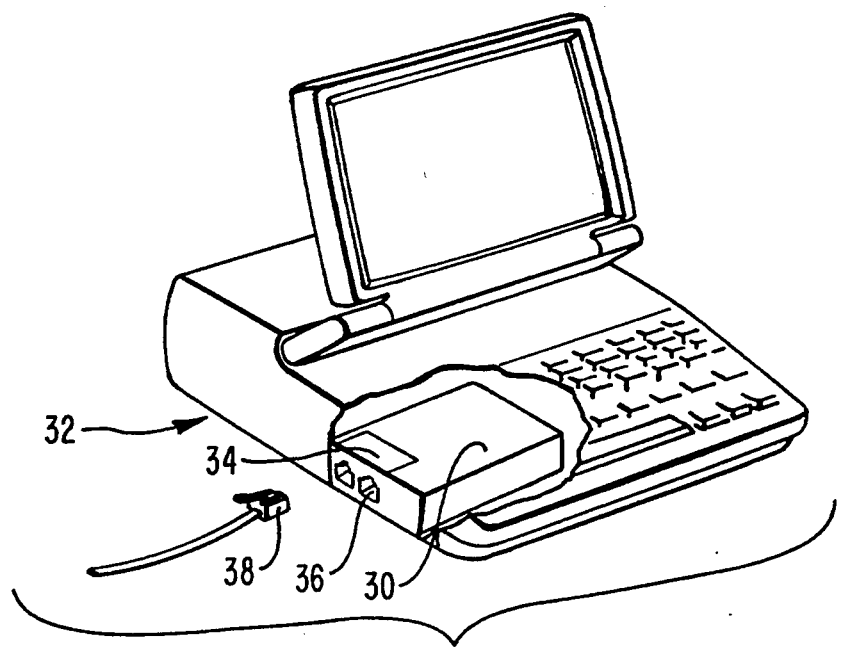
FIG. 2 is a perspective view of a prior art integral modem installed in a portable computer.
Figure 3:
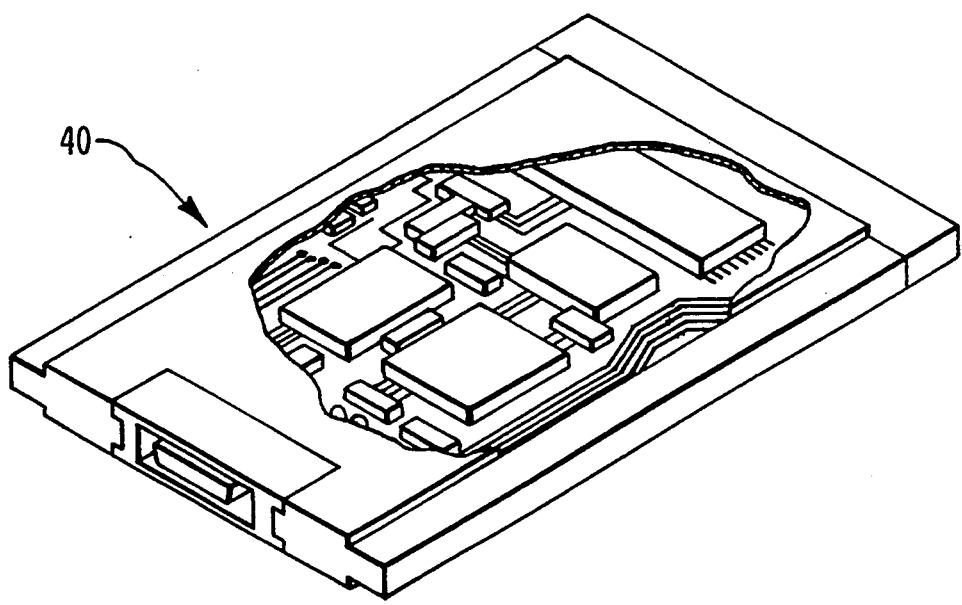
FIG. 3 is a partially cut away perspective view of a PCMCIA-architecture communications card.
Figure 4:
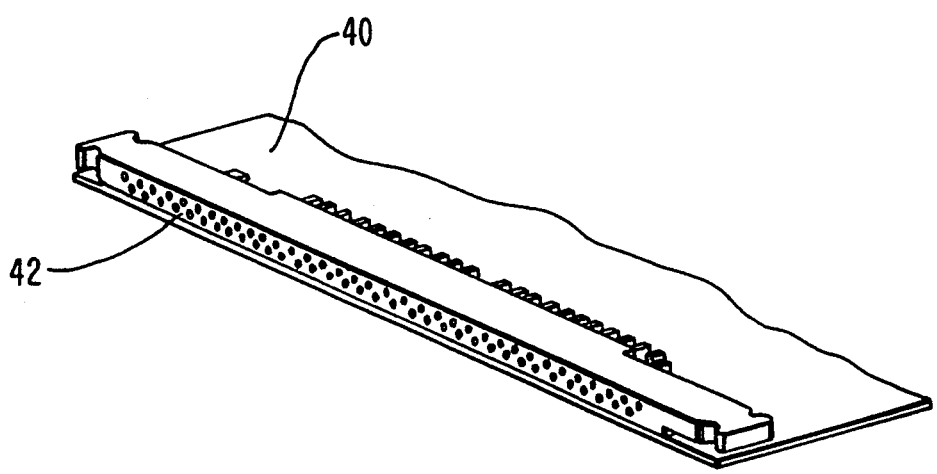
FIG. 4 is a perspective view of a 68 pin connector end of a communications card like the PCMCIA communications card illustrated in FIG. 3.
Figure 5:
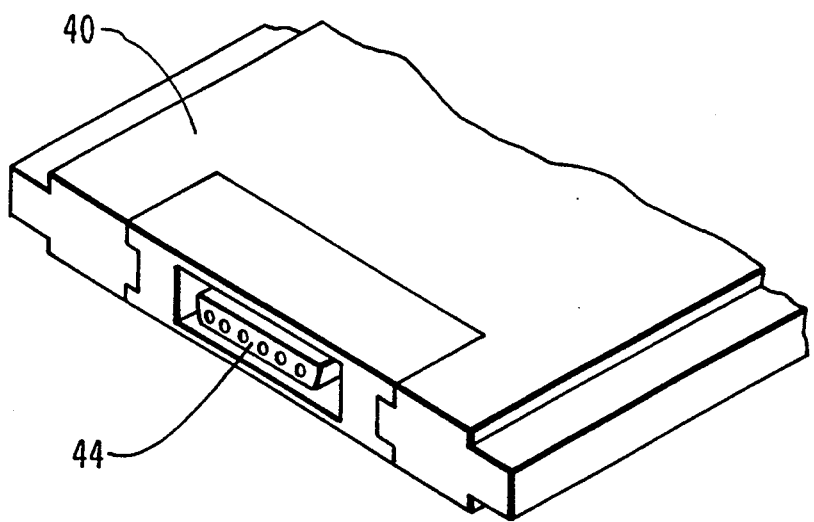
FIG. 5 is an enlarged perspective view of the other end of the PCMCIA-architecture communications card illustrated in FIG. 3 having formed therein a manufacture-specific peripheral socket.
Figure 6:
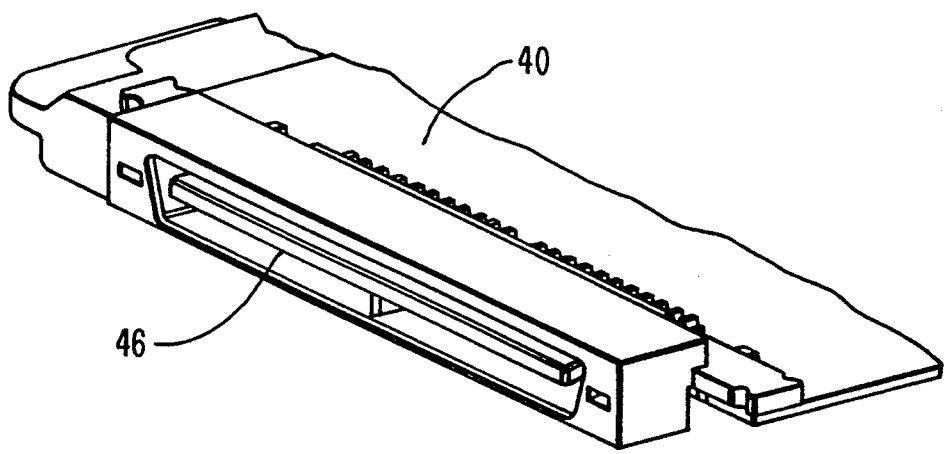
FIG. 6 is an enlarged perspective view of a manufacturer-specific peripheral socket like that illustrated in FIG. 5 utilizing a different podule plug.
Figure 7:
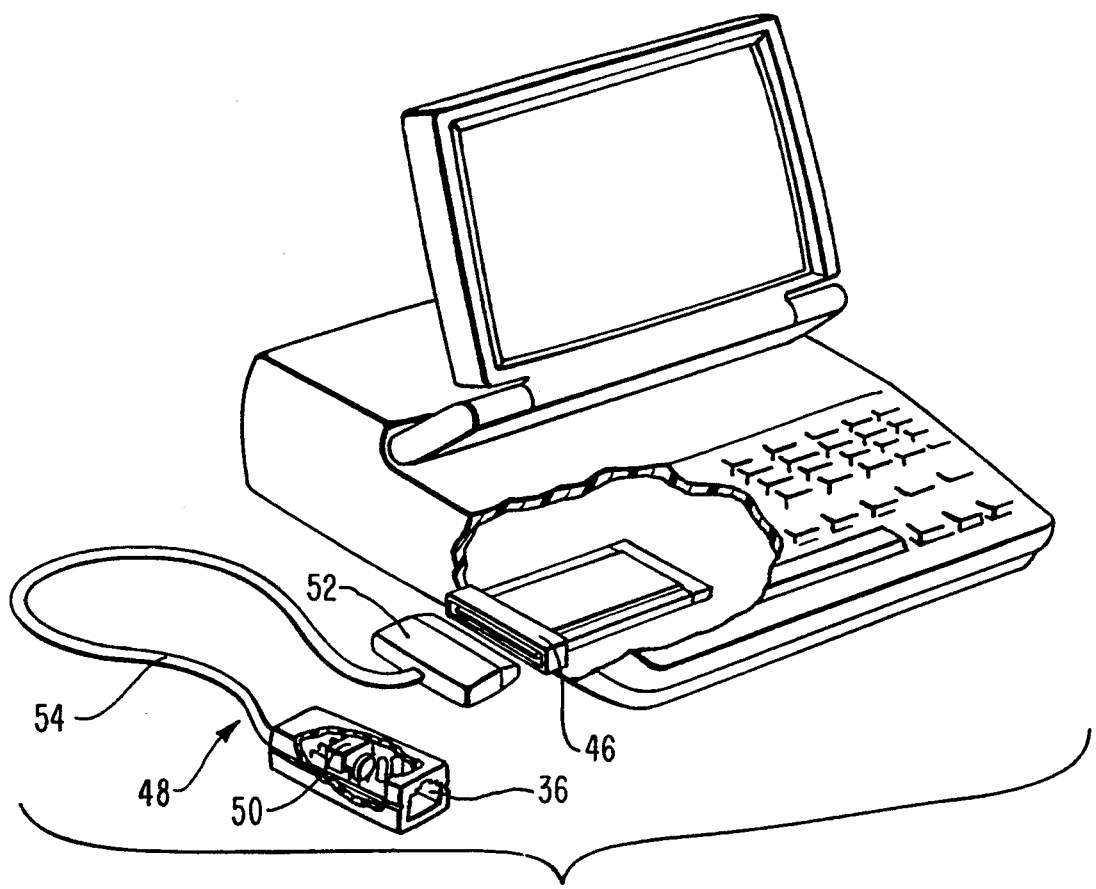
FIG. 7 is a partially cut away perspective view of a portable computer having installed therein an PCMCI-architecture communications card capable of attachment to an intermediate physical/electrical connector.
Figure 8:
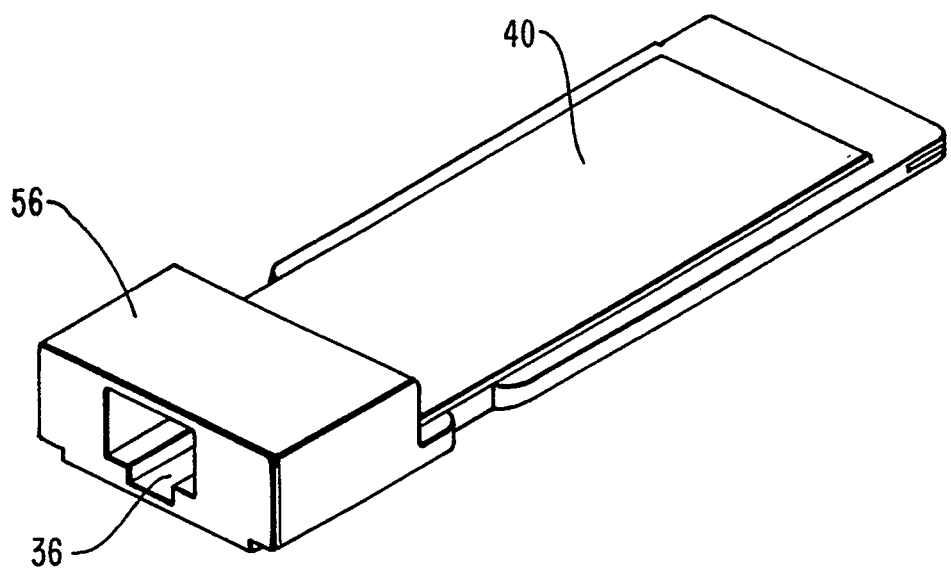
FIG. 8 is a perspective view of an PCMCIA-architecture communications card utilizing an integral DAA and physical/electrical media connector socket.
Figure 9:
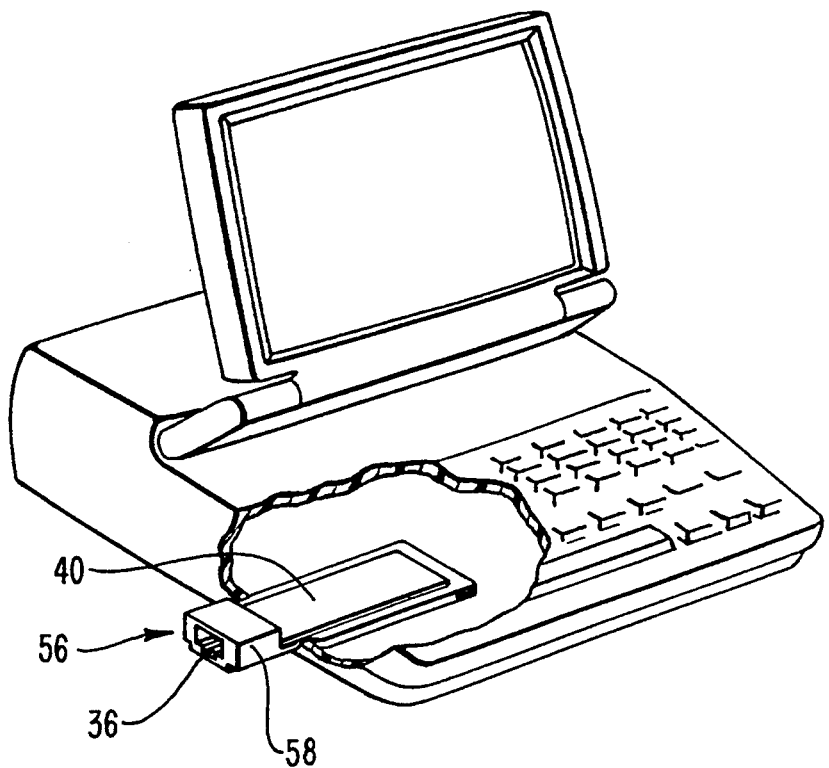
FIG. 9 is partially cut away perspective view of an installation of the communications card illustrated in FIG. 8 into a portable computer.
Figure 10:
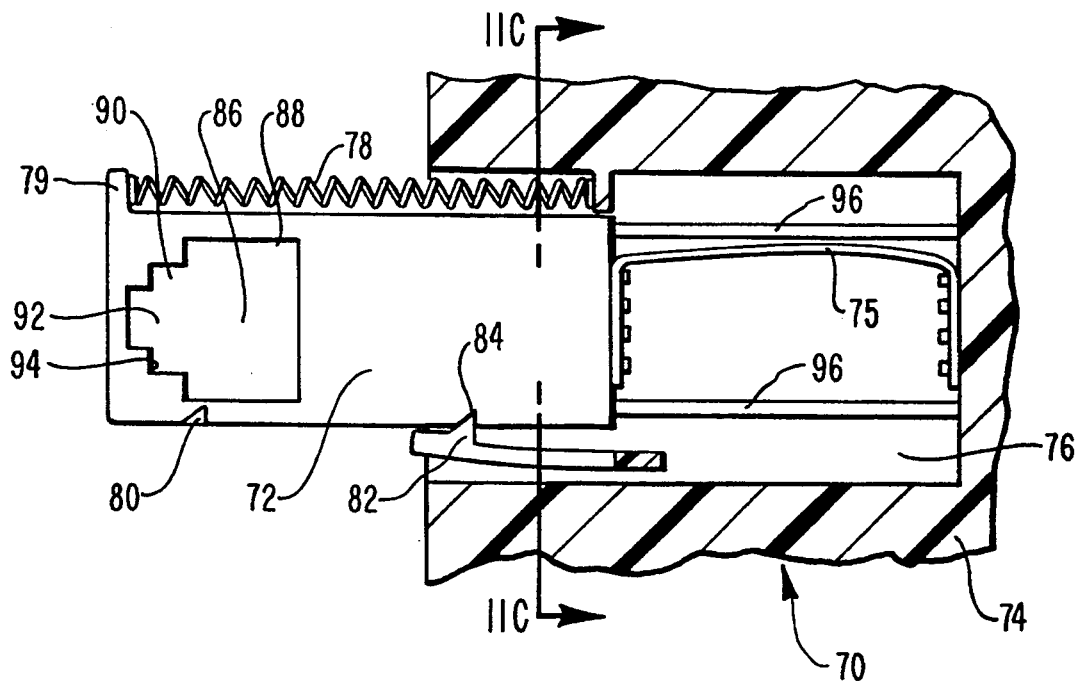
FIG. 10 is a plan view of a first embodiment of an PCMCIA communications card within the scope of the present invention wherein the card is extended ready for insertion by a connector.

FIG. 10 illustrates a PCMCIA standard communications card 70 having a retractable access portion 72 and a fixed portion 74.

Fixed portion 74 is in electrical communication with a computer (not shown). Retractable access portion 72 is in electrical communication with fixed portion 74 through a flexible wire ribbon 75. Retractable access portion 72 slides in and out of a slot 76 formed within communications card 70. Retractable portion 72 is urged out of slot 76 by a spring 78.

According to one aspect of the present invention, the communications card such as illustrated in FIG. 10 is provided with means for biasing the retractable access portion of the communications card in a direction external to the computer housing.

By way of example and not limitation, the biasing means of the embodiment illustrated in FIG. 10 comprise spring 78 and at least one spring ramp 79. A retention notch 80 in combination with a biased lever 82 retains retractable access portion 72 within the housing of the computer.

According to another aspect of the present invention, the communications card such as is illustrated in FIG. 10 is provided with means for selectively retaining the retractable access portion of the communications card within the computer housing.

By way of example and not limitation, the selective retention means of the embodiment illustrated in FIG. 10 comprise retention notch 80 and biased lever 82. A limiting notch 84 is engaged by biased lever 82 when the communications card is extended from the computer housing.

According to still another aspect of the present invention, a communications card such as the communications card illustrated in FIG. 10 is provided with means for restricting the travel of the retractable access portion of the communications card to a predetermined distance.

By way of example and not limitation, the travel restricting means of the embodiment illustrated in FIG. 10 comprise biased lever 82 and limiting notch 84. Biased lever 82 serves as an actuating mechanism to initiate exposure or retraction of the retractable access portion of the communications card.

By way of example and not limitation, an aperture 86 having a plurality of walls 88 is formed within retractable access portion 72. Aperture 86 is so sized and shaped as to be capable of receiving a physical/electrical media connector. Within aperture 86 is formed a broad retention clip groove 90, a narrow retention clip groove 92, and a retention ridge 94. The structures within aperture 86 provide for the retention of a connector pin block of a physical/electrical media connector. A guide track 96 is formed within communications card 70 protruding upwardly from the bottom of communications card 70. Guide track 96 is interengaged with a corresponding guide groove formed in the bottom of retractable access portion 72.

When a user wishes to connect a telephone line to the communications card, biased lever 82 is manipulated out of retention notch 80. As retractable access portion 72 is released from the grip of biased lever 82, tension applied by spring 78 urges retractable access portion 72 out of slot 76. The progress of retractable access portion 72 is guided by guide track 96 and is halted when biased lever 82 engages limiting notch 84. A user then inserts a physical/electrical media connector into aperture 86 to provide an electrical connection between communications card 70 and the telephone line.

According to one aspect of the present invention a communications card such as communications card 70 provides means for biasing the retractable access portion of the communications card in a direction away from the computer housing.

By way of example and not limitation, the biasing means employed in the embodiment illustrated in FIG. 10 comprise sprung wire 78. When a user no longer wishes access to retractable access portion 72, the user merely presses retractable access portion 72 back within the confines of the computer housing such that retention notch 80 will be engaged by biased lever 82 to prevent inadvertent exposure of retractable access portion 72 outside of the computer housing.

According to another feature of the present invention a communications card such as communications card 70 is provided with means for selectively retaining the retractable access portion of the communications card within a computer housing. By way of example and not limitation, the selective retention means at the embodiment illustrated in FIG. 10 comprise retention notch 80 and biased lever 82.

After use, the physical/electrical media connector is removed from aperture 86, and biased lever 82 is removed from limiting notch 84. Pressure opposing spring 78 is then applied until biased lever 82 engages retention notch 80. Engagement of biased lever 82 into retention notch 80 secures the communications card within the housing of the computer, thereby protecting the communications card from breakage during transport of the computer. Direct connection of a physical/electrical media connector to the communications card eliminates the need for an external DAA and also eliminates the need for an enclosed physical/electrical media connector socket.

According to one aspect of the present invention, a communications card such as the communications card illustrated in FIG. 10 is provided with means for maintaining electrical communication between the retractable access portion of the communications card and the fixed remainder of the communications card as the retractable access portion of the communications card travels in and out of the computer housing.

By way of example and not limitation, the electrical communication maintenance means of the embodiment illustrated in FIG. 10 comprise flexible wire ribbon 75. Flexible wire ribbon 75 is connected at one end both physically and electrically to communications card 70. The other end of flexible wire ribbon 75 is connected both physically and electrically to retractable access portion 72.

Figure 11:
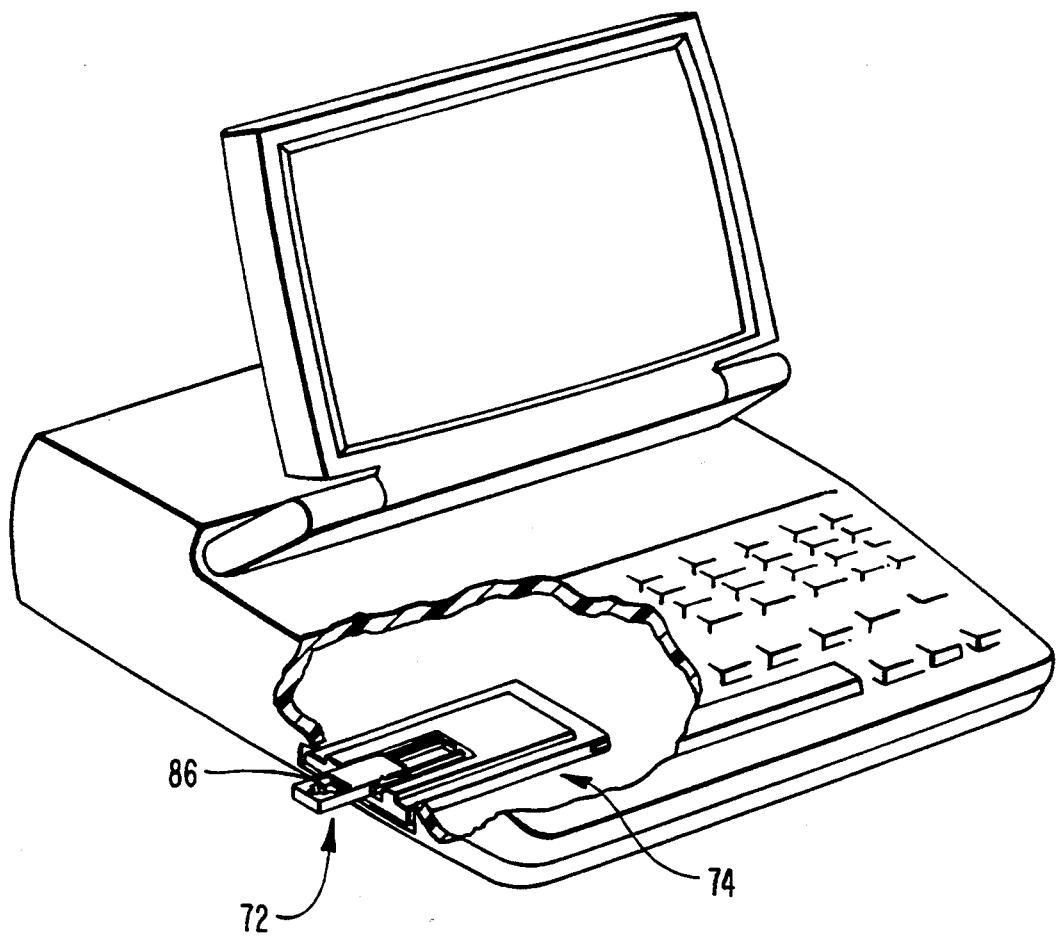
FIG. 11 is a perspective view of a computer having a PCMCIA communications card inserted therein.
Figure 11A:
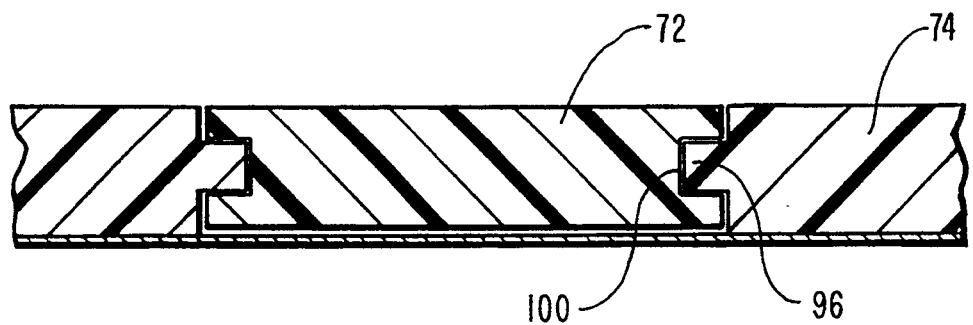
FIG. 11a is a cross-sectional view of a retractable access portion of a communications card of the present invention and mounted in a remainder of the communications card.

FIG. 11a illustrates retractable access portion 72 of PCMCIA communications card 70 interengaged with fixed portion 74 through the interaction of guide track 96 with guide channel 100.

Figure 11B:
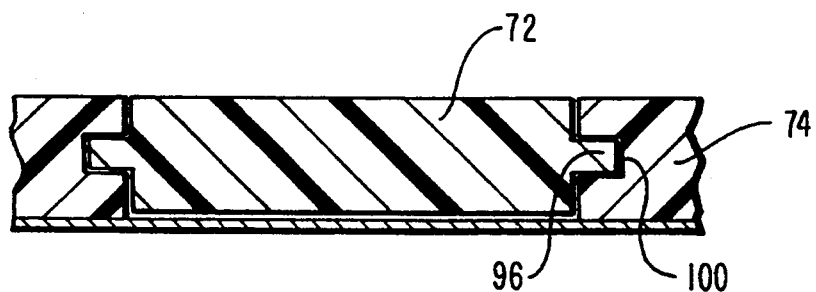
FIG. 11b is a second embodiment of a retractable access portion such as that illustrated in FIG. 11a also mounted in a PCMCIA communications card.
Figure 11C:
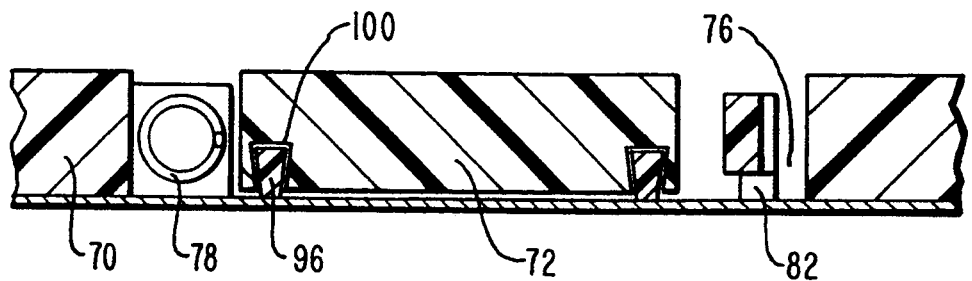
FIG. 11c is a cross-section of the communications card taken along lines 11c—11c in FIG. 10.

According to one aspect of the present invention, a communications card such as communications card 70 illustrated in FIGS. 11a-c provides means for guiding the travel of the retractable access portion of the communications card as the retractable access portion of the communications card travels in and out of the computer housing.

By way of example and not limitation, the guiding means of the embodiment illustrated in FIGS. 11a-c comprise guide channel 100 and guide track 96. When access to retractable access portion 72 is required, the user manipulates retractable access portion 72 through a slot in the housing in the computer guided by guide track 96 and guide channel 100.

FIG. 11b illustrates an alternate embodiment of the guiding means illustrated in 11a, wherein the guide track 96 and guide channel 100 are reversed such that guide track 96 is formed in fixed portion 74 and guide channel 100 is formed in retractable access portion 72.

FIG. 11c is a cross-sectional view taken along lines 11c—11c of FIG. 10 illustrating the interaction of retractable access portion 72 with communications card 70. Retractable access portion 72 is shown having guide channel 100 through which guide track 96 slides when retractable access portion 72 is urged out of slot 76 by spring 78. Guide track 96 is formed on the bottom of PCMCIA communications card 70 protruding upward whereas guide channel 100 is formed in the bottom of retractable access portion 72.

Figure 12:
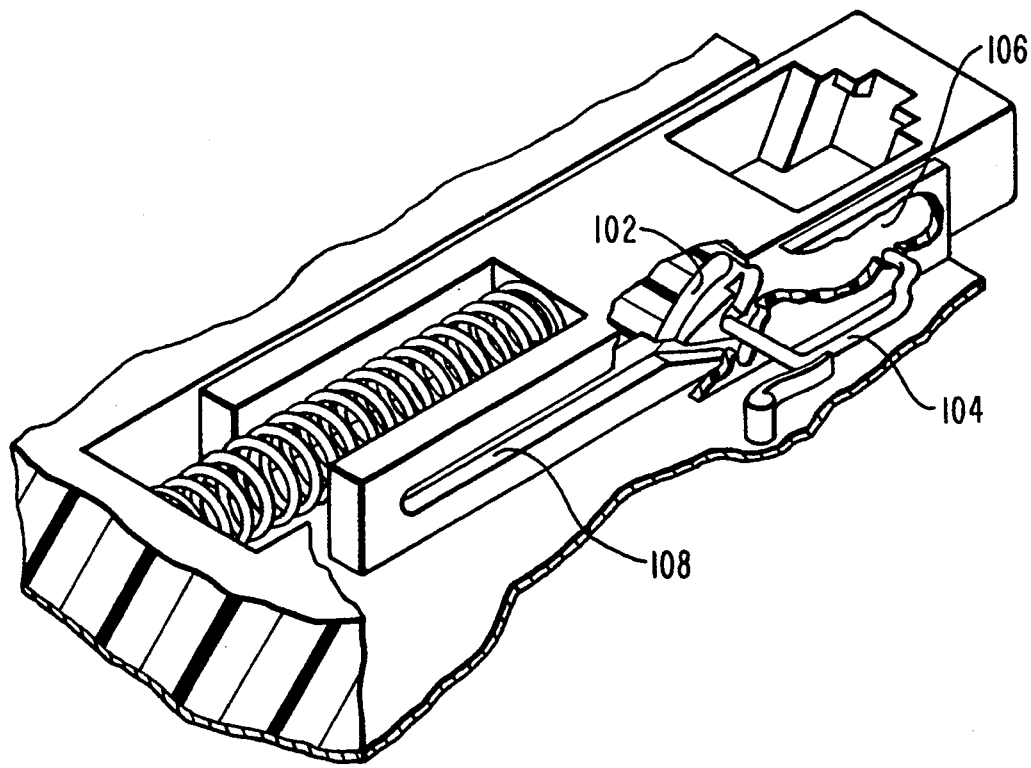
FIG. 12 is a partially cut away perspective view of a retractable access portion of a communications card shown mounted within a remaining portion of a communications card.

FIG. 12 illustrates an alternate embodiment of the present invention incorporating a ratcheted groove 102 through which an actuating shaft 104 travels during exposure and retraction of retractable access portion 72.

In operation, travel of the retractable access portion out of the computer results in travel of actuating shaft 104 progressing through a chevron-shaped ratcheted groove 102 formed in one side of the retractable access portion 72. Actuating shaft 104 is pivotally attached to an upstanding wall 105 which is formed in fixed portion 74. Indentations 101 and flap 103 formed within groove 102 impart a ratcheting action preventing movement of actuating shaft 104 in a retrograde or counter-clockwise motion.

As retractable access portion 72 is exposed outside of the computer housing the movement thereof causes pathway 108 to move relative to statio, actuating shaft 104 extended pathway 108 until reaching the end thereof. Further travel of retractable access portion 72 is halted by contact between actuating shaft 104 and end 107 of linear extended pathway 108. When a user no longer requires exposure of retractable access portion 72, retractable access portion 72 may be manually reinserted through slot 76 until actuating shaft 104 leaves linear extended pathway 108 and continues in a clockwise motion through the chevron-shaped ratcheted groove 102. A biased flap 103 forces shaft 104 upward and shaft 104 travels in a clockwise direction until abutting indentation 101. Gravity then pulls shaft 104 into a resting position in indentation 101. Force from a spring 109 lodges shaft 104 in indentation 101 to retain retractable access portion 72 within the computer housing.

When exposure of the retractable access portion is again desired, the user presses inward on the retractable access portion, thereby allowing shaft 104 to be pulled by gravity down to the bottom of chevron-shaped groove 102. When the user then removes the inward pressure, retractable access protion 72 is then biased by spring 109 in an outward direction and the retractable access portion is exposed.

According to another aspect of the present invention, a communications card such as communications card 70 illustrated in FIG. 12 provides means for selectively retaining the retractable access portion of the communications card within the computer housing. By way of example and not limitation, the selective retention means of the embodiment illustrated in FIG. 12 comprise ratcheted groove 102, actuating shaft 104, and linear extended pathway 108.

Figure 13:
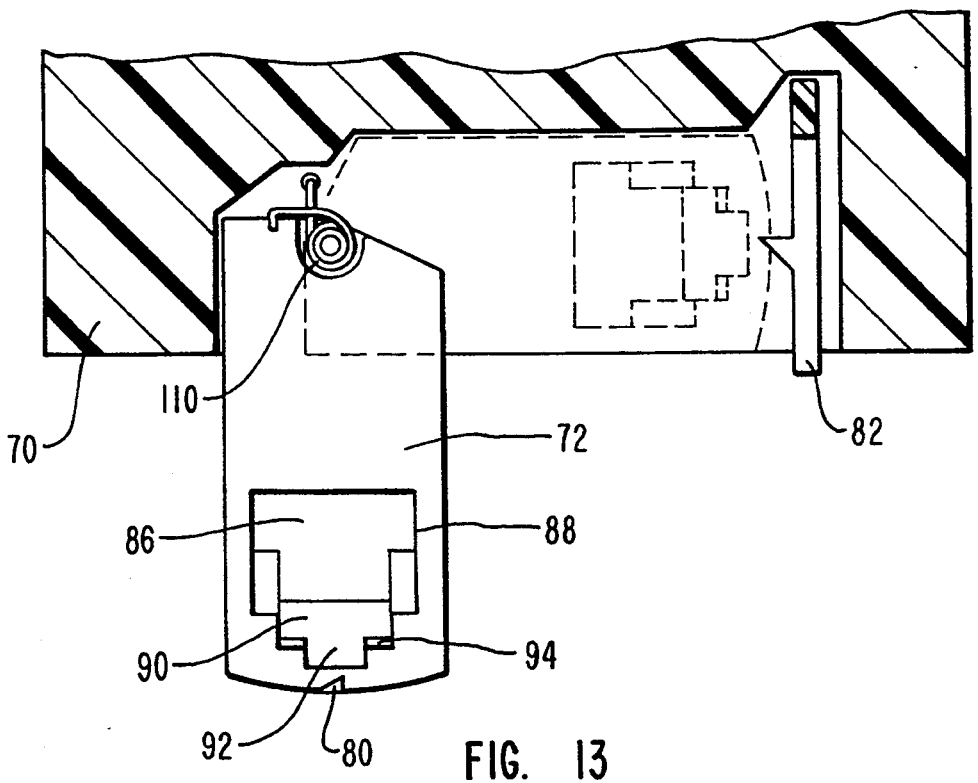
FIG. 13 is a plan of an PCMCIA-architecture communications card capable of being retracted wholly within the housing of the computer.

FIG. 13 illustrates an alternate embodiment of the communications card employing the teachings of the present invention. Retractable access portion 72 is exposed from the computer housing through the use of a sprung wire 110.

According to another aspect of the present invention a communications card such as communications card 70 provides means for biasing the retractable access portion of the communications card in a direction out of the computer housing. By way of example and not limitation, the biasing means employed in the embodiment illustrated in FIG. 13 comprise sprung wire 110. When a user no longer wishes access to retractable access portion 72, the user merely presses retractable access portion 72 back within the confines of the computer housing such that retention notch 80 will be engaged by biased lever 82 to prevent inadvertent exposure of retractable access portion 72 outside of the computer housing.

According to another feature of the present invention a communications card such as communications card 70 is provided with means for selectively retaining the retractable access portion of the communications card within a computer housing. By way of example and not limitation, the selective retention means of the embodiment illustrated in FIG. 13 comprise retention notch 80 and biased lever 82.

Figure 14:
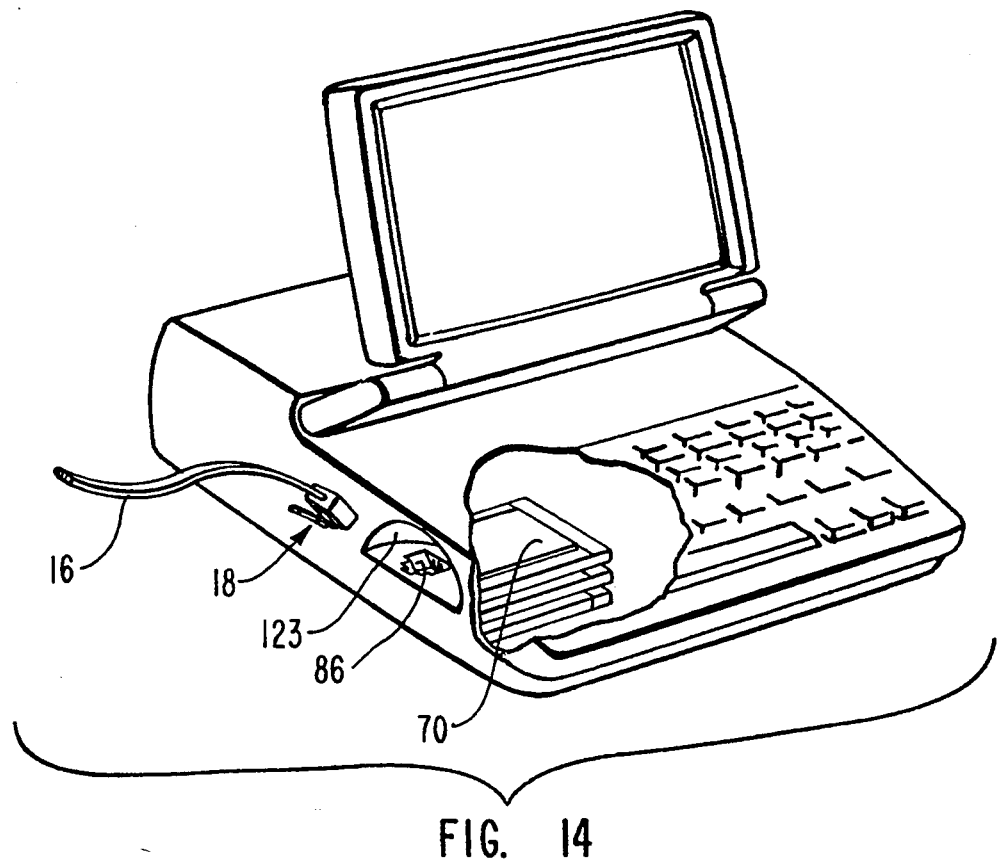
FIG. 14 is a perspective view of a computer housing formed so as to reveal the communications card installed therein.

FIG. 14 depicts the computer housing having formed therein an access tunnel 123. Access tunnel 123 allows direct access to communications card 70 from outside of the computer without the need to move communications card 70. Media connector 18 is inserted through access tunnel 123 directly into communications card 70 to provide a physical and electrical connection between the computer and telephone line 16.

Figure 15:
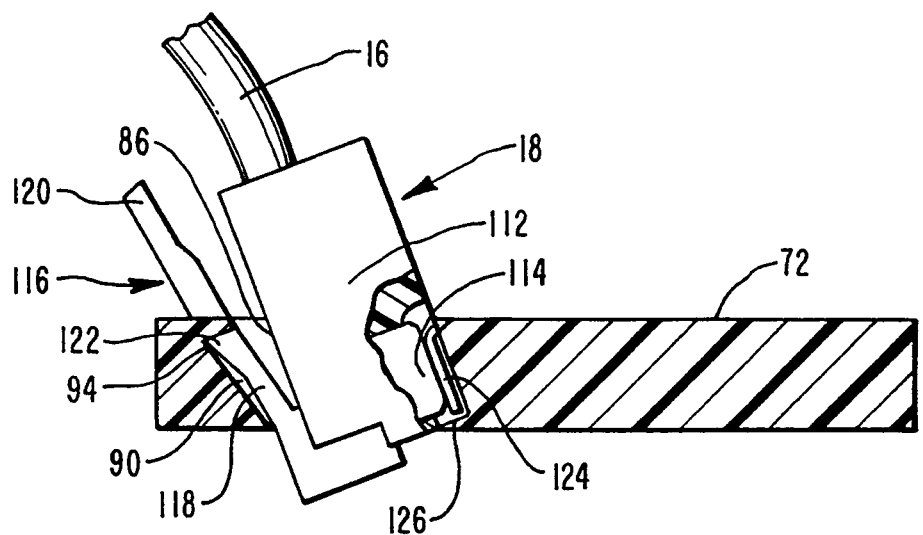
FIG. 15 is a partially broken-away cross-sectional view of a retractable access portion of an PCMCIA communications card having a physical/electrical media connector inserted therein.

FIG. 15 depicts an inventive interface between a physical/electrical media connector 38 and retractable access portion 72. Physical/electrical media connector 38 comprises a contact pin block 112, a plurality of contact pins 114, and a biased retention clip 116. The biased retention clip comprises a broad fixed end 118, a narrow free end 120, and a transition notch 122. Upon insertion of physical/electrical media connector 38 electrical connection is made between a telephone line 16 and retractable access portion 72.

The communications card in FIG. 15 may also be provided with means for preventing passage of the contact pin block completely through the aperture in the communications card. By way of example, the passage prevention means of the embodiment illustrated in FIG. 15 comprise a ledge 126.

Figure 16:
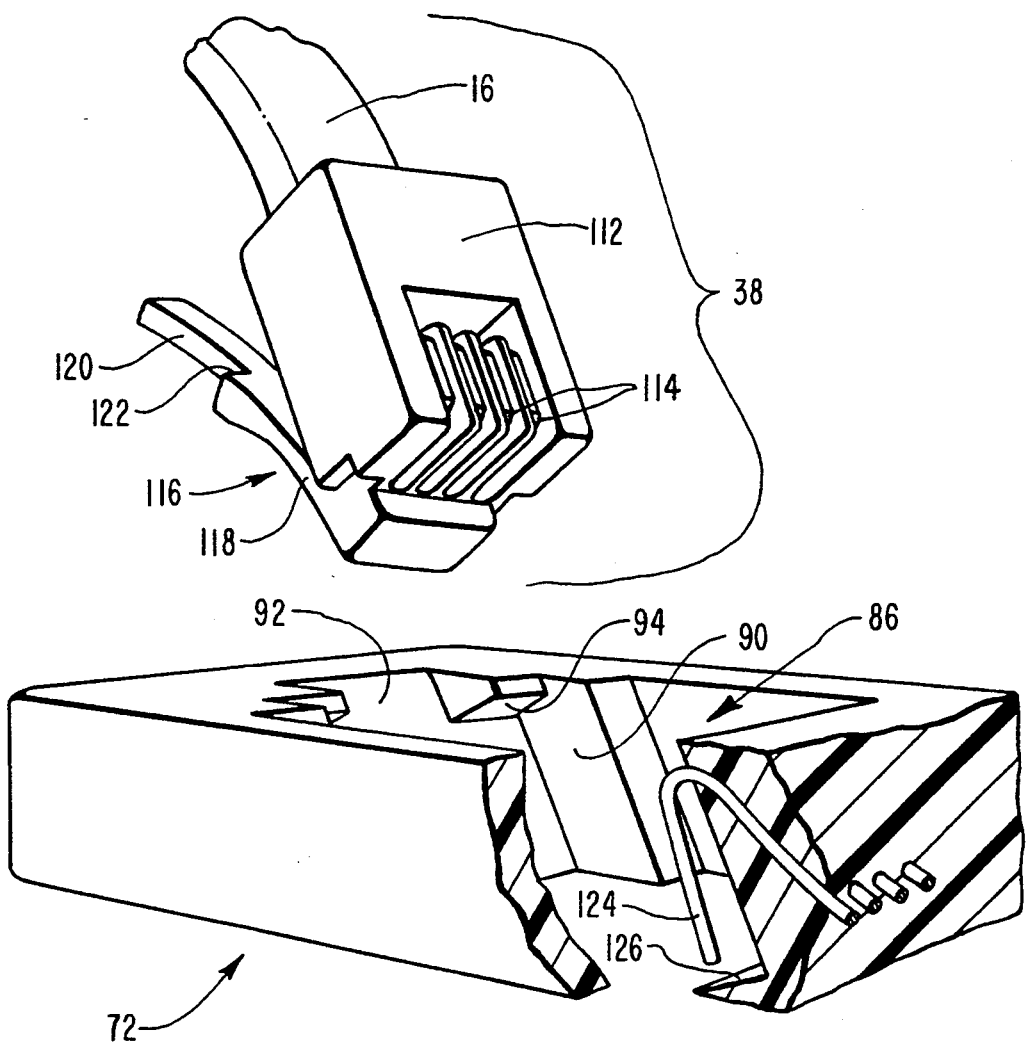
FIG. 16 is a partially broken away perspective view of a retractable access portion of an PCMCIA-architecture communications card having a physical/electrical media connector disconnected therefrom.

FIG. 16 illustrates a conventional RJ-11 plug 38 located near retractable access portion 72 of communications card 70. When inserted, RJ-11 plug 38 initiates electrical connection between contact wires 124 and contact pins 114 to allow the transfer of data from telephone line 16 to the computer. Ledge 126 prevents passage of RJ-11 plug 38 entirely through retractable access portion 72 of communications card 70.

The physical connection of RJ-11 plug 38 into angled aperture 86 is guided by the insertion of broad fixed end 118 into broad retention clip groove 90 of angled aperture 86. Progress of broad fixed end 118 through broad retention clip groove 90 are not impeded. However, once narrow free end 120 of biased retention clip 116 is pressed beyond retention ridge 94, RJ-11 plug 38 is locked within angled aperture 86. To release RJ-11 plug 38 from angled aperture 86, a user merely presses biased retention clip 116 at narrow free end 120 toward contact pin block 112 and withdraws RJ-11 plug 38 from angled aperture 86. Transition notch 122 interacts with retention ridge 94 to lock RJ-11 plug 38 into angled aperture 86 when engaged.

It will be appreciated that the function of angled aperture 86 mirrors closely the function of an enclosed RJ-11 socket without violating the constraints of the PCMCIA communications card architecture. The angle at which angled aperture 86 is formed within this embodiment in retractable access portion 72 is thus limited by the restrictions imposed by the PCMCIA architecture. Apertures utilizing the teachings of the present invention exhibited in this embodiment are formed within the PCMCIA communications card with angles relative to the surface thereof falling within the range of about 15 degrees to about 60 degrees. The preferred angle for the aperture utilized in the embodiment illustrated in FIGS. 10 and 12–16 is 20 degrees measured from a line perpendicular to the faces of the communications card.

Figure 17:
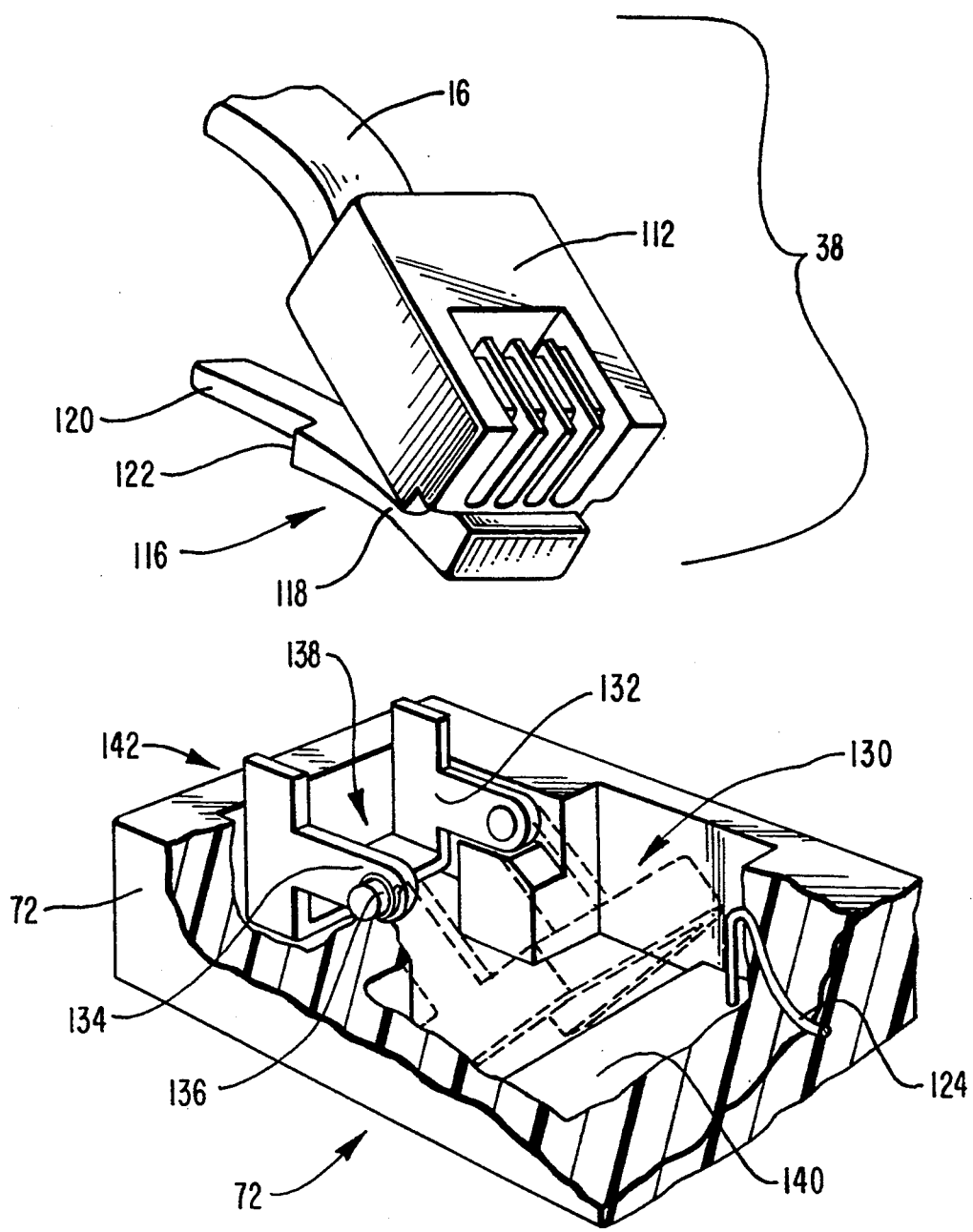
FIG. 17 is a partially broken away perspective view of one embodiment of an interface between a physical/electrical media connector and a 5 mm PCMCIA communications card incorporating the teachings of the present invention.

FIG. 17 illustrates yet another embodiment of the present invention. The embodiment illustrated in FIG. 17 does not employ an angled aperture, but instead utilizes a perpendicular aperture 130 formed within retractable access portion 72 of communications card 40. Such an arrangement requires that additional structures be incorporated into the communications card to either capture retention clip 116 as the clip protrudes above the communications card or to support the lower end of pin block 112 if it protrudes below the communications card. Because of the 5 mm limitations imposed by the PCMCIA 5 mm standard, the 8–15 mm connector must protrude from at least one face of the communications card when inserted in a perpendicular orientation relative to the face of that card.

According to one aspect of the invention, therefore, an aperture, such as the aperture illustrated in FIG. 17 is provided with means for securing the physical/electrical connector within the aperture in the communications card. By way of example and not limitation, the securing means of the embodiment illustrated in FIG. 17 comprise biased retention stirrup 132. Stirrup 132 is pivotally biased by a stirrup spring 134 about the longitudinal axis of a pivot pin 136. Stirrup spring 134 biases stirrup 132 by way of example in a clockwise direction in the embodiment illustrated in FIG. 17. The natural state of repose for stirrup 132 is shown in phantom lines.

When use of perpendicular aperture 130 is desired, stirrup 132 is pivoted out of aperture 130 into a recess 138 thereby removing any obstruction to plug 38 as plug 38 is inserted into aperture 130. In the embodiment illustrated in FIG. 17, travel of plug 38 through aperture 130 is limited by a stop 140 which protrudes into aperture 130. Upon abutment of plug 38 with stop 140, stirrup 132 may be released to pivot under urging from spring 134 into contact with the portion of plug 38 protruding from the upper face of retractable access portion 72.

Stirrup 132 is configured so as to have a retention tab 142 projecting from stirrup 132 so as to be capable of engaging transition notch 122 when plug 38 is abutting stop 140 in aperture 130. Spring 134 maintains engagement of retention tabs 142 with transition notch 122 when connection is made between plug 38 and aperture 130.

Figure 18:
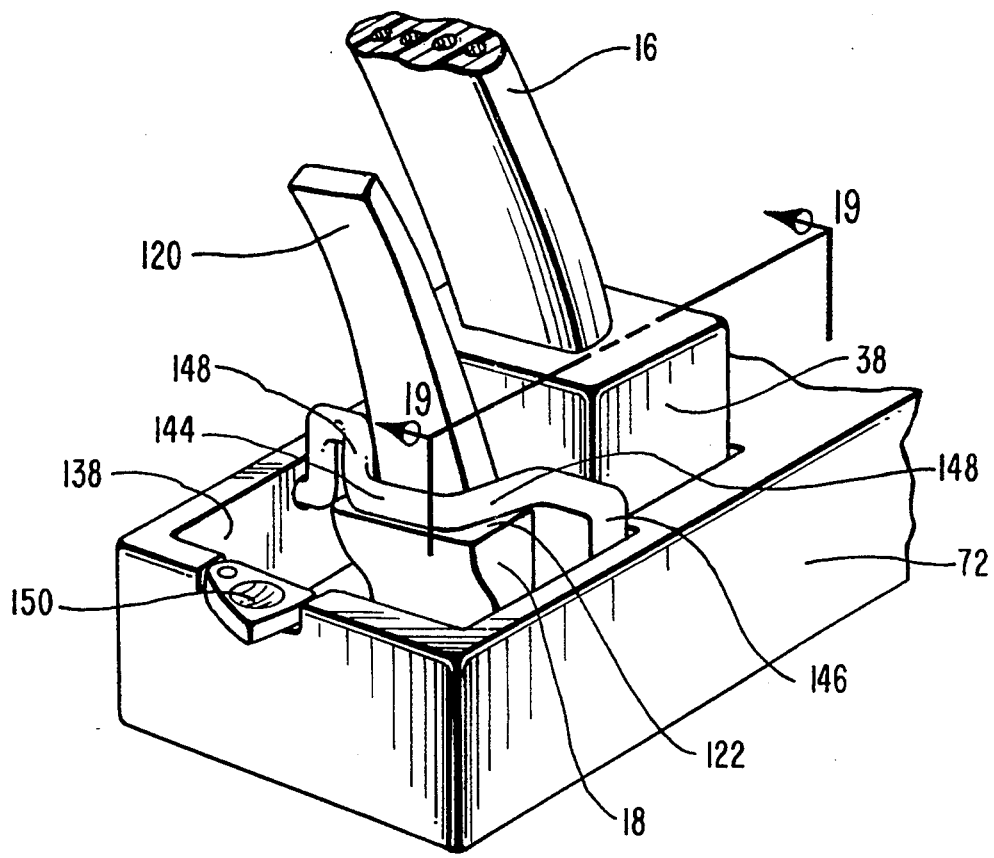
FIG. 18 is a perspective view of the interconnection of the physical/electrical media connector with the communications card.

In the embodiment illustrated in FIG. 18, and according to one aspect of the invention, a retractable access portion of a communications card such as retractable access portion 72 illustrated in FIG. 18 is provided with means for securing the physical/electrical connector within the aperture in the communications card. By way of example and not limitation, the securing means of the embodiment illustrated in FIG. 18 comprise a biased biarcuate stirrup 144. Biarcuate stirrup 144 is pivotally biased against plug 38. Retention of plug 38 with aperture 130 is accomplished through the biarcuate shape of biarcuate stirrup 144.

As used in this specification, the term biarcuate describes any stirrup having a depending attachment leg 146 and a retention leg 148, two attachment legs being positioned apart a distance at least as wide as broad fixed end 18, and the retention legs being capable of engaging transition notch 122.

As illustrated in FIG. 18, when biarcuate stirrup 144 is pressed into recess 138, tension produced by stirrup spring 134 urges biarcuate stirrup 144 into aperture 130. While biarcuate stirrup 144 may be manipulated out of aperture 130 prior to use, it is preferable to have biarcuate stirrup housed so as not to block entry of plug 38 into aperture 130.

According to one aspect of the invention, a stirrup such as the stirrup illustrated in FIG. 18 is provided with means for selectively restraining a stirrup from obstructing the aperture. By way of example and not limitation, the restraining means illustrated in FIG. 18 comprise a locking disk 150. Locking disk 150 selectively engages a stirrup such as biarcuate stirrup 144 to prevent pivoting of biarcuate stirrup 144 into an aperture such as aperture 130.

Figure 19:
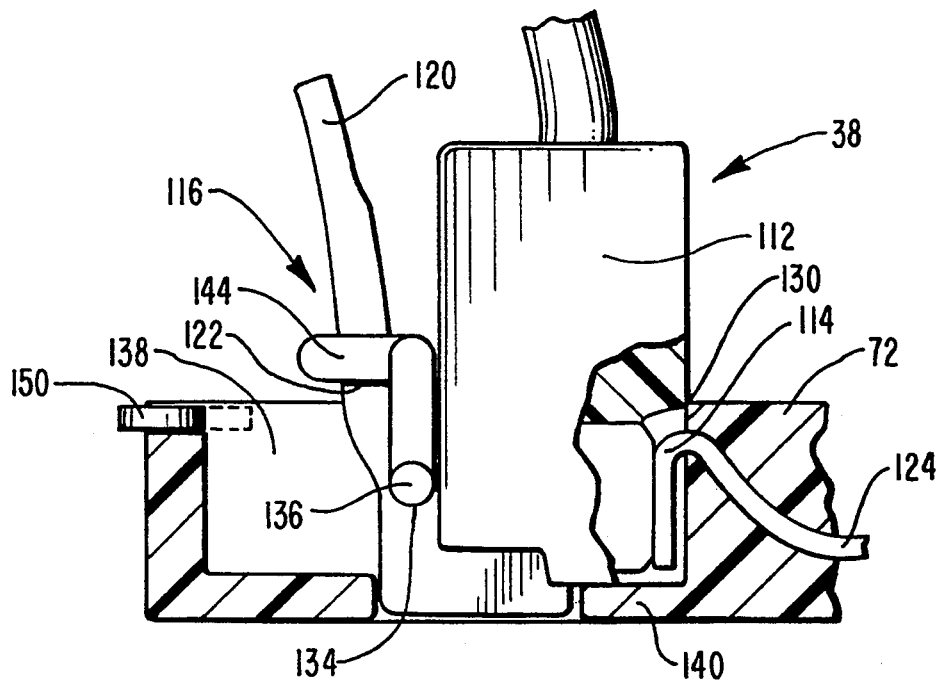
FIG. 19 is a cross-sectional view taken along lines 19—19 in FIG. 18 further illustrating the inventive interface.

FIG. 19 is a cross-sectional view taken along lines 19—19 in FIG. 18 illustrating more specifically the interaction between aperture 130 and plug 38. Biarcuate stirrup 144 is shown engaged with transition notch 122 of biased retention clip 116. Tension produced between biased retention clip 116 and stirrup spring 134 via biarcuate stirrup 144 maintains the engagement of biarcuate stirrup 144 with transition notch 122. When plug 38 is to be withdrawn from aperture 130, a user disengages biarcuate stirrup 144 from transition notch 122 by pressing biarcuate stirrup 144 into recess 138 while withdrawing plug 38 from abutment with stop 140 in aperture 130. When plug 38 is not within aperture 130, biarcuate stirrup 144 will be biased by stirrup spring 134 into aperture 130.

Aperture 130 is positioned within retractable access portion 72 to allow electrical contact between contact wires 124 and the plurality of electrical contact pins 114 located in contact pin block 112. Locking disk 150 selectively engages biarcuate stirrup 144 to prevent pivoting of biarcuate stirrup 144 into aperture 130.

Figure 20:
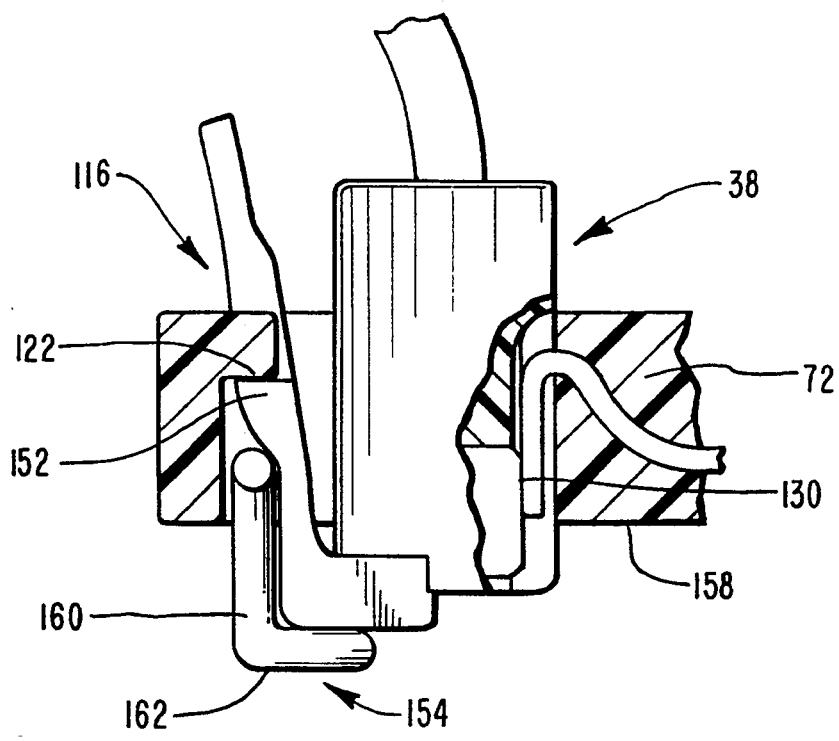
FIG. 20 is a cross-sectional view of an embodiment of an interface incorporating the teachings of the present invention.

FIG. 20 illustrates a retractable access portion 72 of a communications card having formed therein perpendicular aperture 130 as illustrated in FIG. 19. The embodiment of the present invention illustrated in FIG. 20 differs from that in FIG. 19 in that plug 38 is not stopped by a protrusion from the wall of aperture 130, but is instead allowed to pass partially through retractable access portion 72. Partial passage of plug 38 through retractable access portion 72 allows transition notch 122 of biased retention clip 116 to be engaged by a perpendicular retention ridge 152 formed within aperture 130.

To prevent passage of plug 38 completely through aperture 130, and according to one aspect of the invention, a retractable access portion of a communications card like that illustrated in FIG. 20 is provided with means for preventing passage of the plug completely through the aperture. By way of example and not limitation, the passage prevention means of the embodiment illustrated in FIG. 20 comprise a pivot arm 154. Pivot arm 154 is biased into aperture 130 by a pivot arm spring 156.

As plug 38 is introduced into aperture 130, plug 38 forces pivot arm 154 out of aperture 130 into a position below and perpendicular to a lower face 158 of retractable access portion 72. In this perpendicular position illustrated in FIG. 20, a depending arm 160 of pivot arm 154 is perpendicular to face 158. An abutment arm 162 protrudes perpendicular to depending arm 160. As pivot arm 154 is pressed out of aperture 130 by plug 38, the progress of plug 38 is halted upon abutment with abutment arm 162. At the point of abutment, transition notch 122 will be engaged by retention ridge 152 thereby securing plug 38 in aperture 130. Electrical contact between the plurality of contact pins 114 and contact wires 124 will also occur at this point.

To remove plug 38 from aperture 130, a user presses biased retention clip 116 against contact pin block 112 and pulls plug 38 out of aperture 130.

Figure 21:
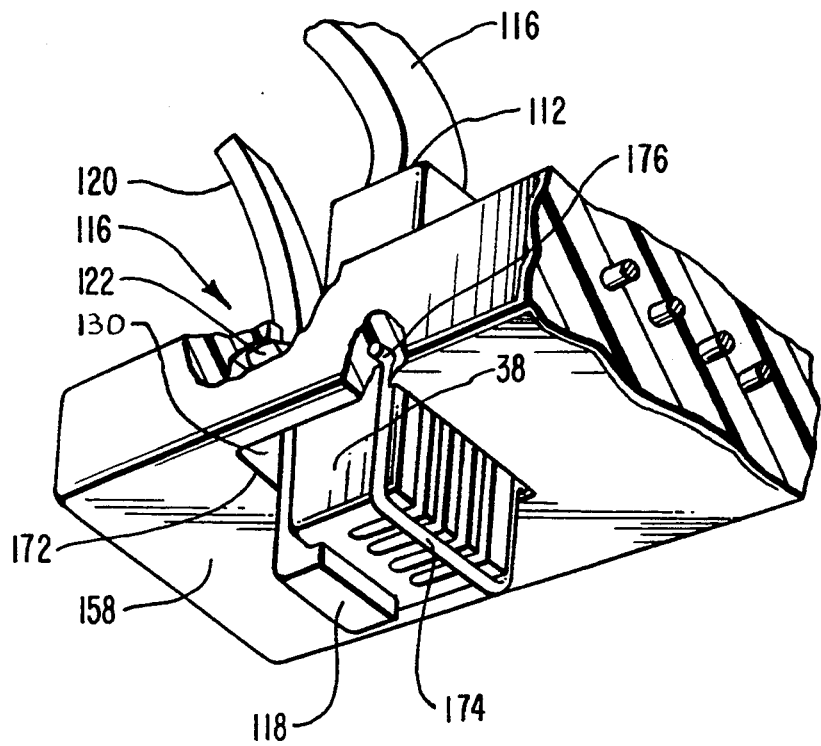
FIG. 21 is a cross-sectional view of an embodiment of an interface incorporating the teachings of the present invention.

FIG. 21 illustrates the presently preferred embodiment of the present invention.

Upon introduction of plug 38 into aperture 130, stirrup 174 is pivoted out of an orientation parallel with lower surface 158 into a perpendicular orientation therewith. Upon reaching a depending condition, stirrup 174 prevents further passage of plug 38 through aperture 130. At this point a sufficient portion of plug 38 is extending below surface 158 to allow capture of the transition notch of the bias retention clip by the retention ridge formed in the wall of aperture 130. The sufficient portion of the electrical contacts within plug 38 remain in the aperture 130 to afford electrical communication with the contact wires formed within the retractable access portion of the communications card.

According to one aspect of the invention, a retractable access portion of a communications card like that illustrated in FIG. 21 is provided with means for preventing passage of the plug completely through the aperture. By way of example and not limitation, the passage prevention means of the embodiment illustrated in FIG. 21 comprise a pivoting dependant stirrup 174. Although retraction of the retractable access portion will pivot the stirrup into aperture 130 without the need for a spring, stirrup 174 may be biased into the aperture 130 by a spring 176.

Figure 22:
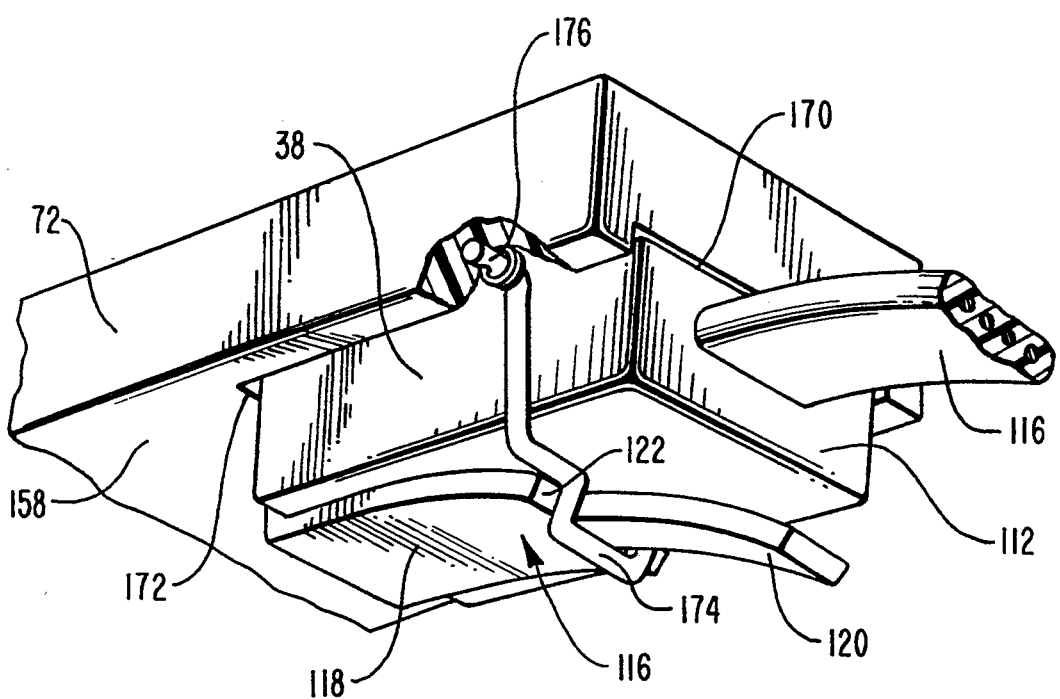
FIG. 22 is a partially broken away perspective view of an embodiment of an interface between a physical/electrical media connector and a 5 mm PCMCIA communications card incorporating the teachings of the present invention.

FIG. 22 illustrates an embodiment of the present invention utilizing a retention channel with a longitudinal axis parallel with and formed in lower face 158. Retention channel 170 serves to resist lateral movement of plug 38. Channel 170 terminates in an end wall 172 against which plug 38 abuts when fully inserted into channel 170. Plug 38 is held in channel 170 by a support stirrup 174 pivotally attached to retractable access portion 72. A spring 176 biases support stirrup 174 into channel 170.

In use, support stirrup 174 will be pivoted out of channel 170 and plug 38 will be inserted into support stirrup 174. Plug 38 is inserted into channel 170 until contact pin block 112 abuts end wall 172 whereupon support stirrup 174 engages transition notch 122 of biased retention clip 116.

To disengage plug 38 from channel 170, a user presses biased retention clip 116 toward contact pin block 112 thereby disengaging support stirrup 174 from transition notch 122.

By allowing the direct insertion of conventional RJ-type physical/electrical media connectors into the communications card, the present invention obviates the need for any external podule or other device that must be carried externally in addition to the computer. If a portable computer is to be transported, the telephone line and compatible physical/electrical media connector can be easily disconnected and the communications card may then be retracted into the housing of the computer. Retraction of the communications card prevents breakage and allows portfolios designed to carry the computer to function in a normal manner without the impedance of any apparatus protruding from the side of the computer housing.

As the DAA is built internally into the PCMCI-architecture communications card no external DAA is required. The advantage of having an internal DAA and the ability to directly connect an RJ-11 or other RJ-type physical/electrical media connector are best realized when a user must frequently transport a portable computer between locations.

Similar advantages are realized when using the inventive interface in connection with a LAN. Direct insertion of a plug physically compatible with an FCC Part 68, subpart F-specification 8-pin miniature modular plug directly into a PCMCIA communications card obviates the need for any external podule or other device that must be used to connect the LAN to the variety of cable being used. By standardizing LANs to an 8-pin miniature modular plug physical/electrical media connector, the advantages of interchangeability and commonality can be realized. Incorporation of a socket capable of receiving an 8-pin miniature modular plug allows for direct connection to a PCMCIA communications card imparting LAN capabilities to laptop and notebook-type computers. As no external equipment need protrude from the computer housing, portfolios and similar equipment designed around the shape of the laptop or notebook computer is not impeded.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Patent is:

1. A communications connection system allowing connection of a physical/electrical media connector to a communications card, the system comprising:

(a) a portable computer having a PCMCIA communications card slot in a housing;

(b) a PCMCIA credit card type communications card capable of being inserted into the slot within the housing, the communications card being in electrical communication with the computer, the communications card having a retractable access portion and a remainder portion, the retractable access portion having formed therein walls forming an aperture; and (c) means for selectively moving the retractable access portion of the PCMCIA communications card to a position outside of the computer housing to expose the aperture outside of the computer housing for reception of the physical/electrical media connector.

2. A direct communications media connecting system as recited in claim 1, wherein the means for selectively exposing the retractable access portion of the communications card outside of the computer housing comprise a slot formed in the computer housing capable of emitting the retractable access portion of the communications card.

3. A direct communications media connecting system as recited in claim 1, wherein the means for selectively exposing the retractable access portion of the communications card further comprise means for guiding the travel of the retractable access portion of the communications card as the retractable access portion of the communications card travels in and out of the computer housing.

4. A direct communications media connecting system as recited in claim 3, wherein the means for guiding the travel of the retractable access portion of the communications card as the retractable access portion of the communications card travels in and out of the computer housing comprise a channel formed in the edges of the communications card surrounding the portion of the communications card that travels in and out and a corresponding guide track formed in the edges of the portion of the communications card that travels in and out.

5. A direct communications media connecting system as recited in claim 3, wherein the means for guiding the movement of the retractable access portion of the communications card as the retractable access portion of the communications card travels in and out of the computer housing comprise a guide track formed in the edges of the communications card surrounding the retractable access portion of the communications card that travels in and out and a corresponding channel formed in the edges of the portion of the communications card that travels in and out.

6. A direct communications media connecting system as recited in claim 3, wherein the means for guiding the travel of a retractable access portion of the communications card as the retractable access portion of the communications card travels in and out of the computer housing comprise a channel formed in the bottom of the retractable access portion of the communications card that travels in and out and a corresponding protruding guide track formed on a corresponding face of the communication card.

7. A direct communications media connecting system as recited in claim 1, wherein the means for selectively exposing the retractable access portion of the communications card outside of the computer housing further comprise means for biasing the retractable access portion of the communications card in a direction away from the computer housing.

8. A direct communications media connecting system as recited in claim 7, wherein the means for biasing the retractable access portion of the communications card in a direction away from the computer housing comprise a spring affixed to both the communications card and the retractable access portion of the communications card such that the spring biases the retractable access portion of the communications card in an outward direction.

9. A direct communications media connecting system as recited in claim 1, wherein the means for selectively exposing the retractable access portion of the communications card outside of the computer housing further comprise means for restricting the travel of the retractable access portion of the communications card to a predetermined distance.

10. A direct communications media connecting system as recited in claim 9, wherein the means for restricting the travel of the retractable access portion of the communications card to a predetermined distance comprise a chevron-shaped groove formed in the retractable access portion and an actuating shaft pivotally affixed to the remainder portion of the communications card, the actuating shaft traveling within the chevron-shaped groove.

11. A direct communications media connecting system as recited in claim 9, wherein the means for restricting the travel of the retractable access portion of the communications card to a predetermined distance comprise a notch formed within an edge of the retractable access portion of the communications card capable of receiving a lever with a tip of corresponding shape, the lever being pivotally fixed to the housing of the computer and biased in the direction of the edge of the retractable access portion of the communications card.

12. A direct communications media connecting system as recited in claim 1, wherein the means for selectively exposing the retractable access portion of the communications card outside of the computer housing further comprise means for selectively retaining the retractable access portion of the communications card within the computer housing.

13. A direct communications media connecting system as recited in claim 12, wherein the means for selectively retaining the retractable access portion of the communications card within the computer housing comprise a notch formed within an edge of the retractable access portion of the communications card capable of receiving a lever with a tip of corresponding shape, the lever being pivotally fixed to the housing of the computer and biased in the direction of the edge of the retractable access portion of the communications card.

14. A direct communications media connecting system as recited in claim 12, wherein the means for selectively retaining the retractable access portion of the communications card within the computer housing comprise:
  (a) a ratcheted groove formed within an edge of the retractable access portion of the communications card; and
  (b) an actuating shaft pivotally connected to the remainder portion, the actuating shaft traveling within the ratcheted groove.

15. A direct communications media connecting system as recited in claim 14, wherein the ratcheted groove is chevron-shaped.

16. A direct communications media connecting system as recited in claim 1, wherein the means for selectively exposing the retractable access portion of the communications card outside of the computer housing further comprise means for maintaining electrical communication between the retractable access portion of the communications card an the remainder of the communications card as the retractable access portion of the communications card travels in and out through the computer housing.

17. A direct communications media connecting system as recited in claim 16, wherein the means for maintaining electrical communication between the retractable access portion of the communications card and the remainder of the communications card comprise a flexible wire ribbon attached at one end to the retractable access portion of the communications card and at the other end to the remainder of the communications card.

18. A direct communications media connecting system as recited in claim 1, wherein the means for selectively exposing a retractable access portion of the communications card outside of the computer housing further comprise an actuating mechanism capable of releasing the retractable access portion.

19. A communications media direct connection system providing electrical communication between a media connector and a communications card, the system comprising:
  (a) a portable computer having a housing;
  (b) a communications card capable of being stored in the housing, the communications card being in electrical communication with the computer, the communications card having a retractable access portion and a remainder portion, the retractable access portion having formed therein walls forming an aperture;
  (c) a slot formed in the computer housing capable of emitting the retractable access portion of the communications card to move the aperture to a position outside of the computer housing for reception of the media connector; and
  (d) means for biasing the retractable access portion of the communications card in a direction away from the computer housing.

20. A direct communications media connecting system as recited in claim 19, wherein the means for biasing the retractable access portion of the communications card in a direction away from the computer housing comprise a spring affixed to both the communications card and the retractable access portion of the communications card such that the spring biases the retractable access portion of the communications card in an outward direction.

21. A communications connection system allowing electrical communication between a media connector and a communications card, the system comprising:
  (a) a computer having a housing;
  (b) a PCMCIA communications card in electrical communication with the computer, the communications card having a retractable access portion and a remainder portion, the retractable access portion having formed therein walls forming an aperture;
  (c) a slot formed in the computer housing capable of emitting the retractable access portion of the communications card to expose the aperture outside of the computer housing for reception of the media connector; and (d) means for restricting the travel of the retractable access portion of the communications card to a predetermined distance;

(e) means for selectively retaining the retractable access portion of the communications card within the computer housing;

(f) means for maintaining electrical communication between the retractable access portion of the communications card and the remainder of the communications card as the retractable access portion of the communications card travels in and out through the computer housing.

22. A direct communications media connecting system as recited in claim 21, wherein the means for restricting the travel of the retractable access portion of the communications card to a predetermined distance comprise a chevron-shaped groove formed in the side of the retractable access portion and an actuating shaft pivotally affixed to a portion of the remainder of the card, the actuating shaft traveling within the chevron-shaped groove.

23. A direct communications media connecting system as recited in claim 21, wherein the means for restricting the travel of the retractable access portion of the communications card to a predetermined distance comprise a notch formed within an edge of the retractable access portion of the communications card capable of receiving a lever with a tip of corresponding shape, the lever being pivotally fixed to the housing of the computer and biased in the direction of the edge of the retractable access portion of the communications card.

24. A direct communications media connecting system as recited in claim 21, wherein the means for selectively retaining the retractable access portion of the communications card within the computer housing comprise a notch formed within an edge of the retractable access portion of the communications card capable of receiving a lever with a tip of corresponding shape, the lever being pivotally fixed to the housing of the computer and biased in the direction of the edge of the retractable access portion of the communications card.

25. A direct communications media connecting system as recited in claim 21, wherein the means for selectively retaining the retractable access portion of the communications card within the computer housing comprise:

(a) a ratcheted groove formed within an edge of the retractable access portion of the communications card; and (b) an actuating shaft pivotally connecting to the remainder portion of the communications card.

26. A direct communications media connecting system as recited in claim 25, wherein the ratheted groove is chevron-shaped.

27. A direct communications media connecting system as recited in claim 21, wherein the means for maintaining electrical communication between the retractable access portion of the communications card and the remainder of the communications card comprise a flexible wire ribbon attached at one end to the retractable access portion of the communications card and at the other end to the remainder of the communications card.

28. A direct communications media direct connection system as recited in claim 21, further comprising an actuating mechanism capable of releasing the retaining means thereby allowing the retractable access portion of the communications card along the guiding means until the travel of the retractable access portion of the communications card is halted by the travel restricting means.

29. A direct communications media connecting system as recited in claim 28, wherein the actuating mechanism comprises a notch formed in the side of the retractable access portion of the communications card and an exposed lever with a tip corresponding in shape to the notch, the lever being biased in the direction of the edge of the retractable access portion of the communications card and being accessible by a user.

30. A communications media connection system, the system comprising:

(a) a portable computer having a PCMCIA communications card slot in a housing;

(b) a PCMCIA communications card capable of being inserted into the slot within the housing, the PCMCIA communications card being in electrical communication with the computer, the communications card being substantially enclosed by the computer housing; and (c) an access tunnel formed in the computer housing through which electrical connection can be attained between a portion of the communications card and a media connector so as to provide for direct connection of a media connector to the communications card.

31. A communications media connection system as recited in claim 30, wherein the access tunnel is crescent shaped.

* * * * *

UNITED STATES PATENT AND TRADEMARK OFFICE
CERTIFICATE OF CORRECTION

PATENT NO. : 5,336,099
DATED : August 9, 1994
INVENTOR(S) : STEPHEN C. ALDOUS et al.

It is certified that error appears in the above-indentified patent and that said Letters Patent is hereby corrected as shown below:

Column 7, line 64, "68 pin" should be --Pin--
Column 12, lines 60 and 64, "an" should be --a--
Column 12, line 66, after "is" insert --a--
Column 13, line 1, "an" should be --a--
Column 13, line 6, ";" should be --.--
Column 13, lines 20, 27 and 31, "an" should be --a--
Column 16, line 44, "statio" should be --static--
Column 16, line 45, delete "extended pathway 108 until reaching the end" and insert therefor --which moves within pathway 108 until reaching end 107--
Column 16, line 66, "protion" should be --portion--
Column 24, line 5, "an" should be --and--

Signed and Sealed this

Twenty-fifth Day of April, 1995

Attest:

BRUCE LEHMAN

*Attesting Officer*     *Commissioner of Patents and Trademarks*